(12) United States Patent
Opfer

(10) Patent No.: US 9,110,177 B1
(45) Date of Patent: Aug. 18, 2015

(54) GENERATION AND USE OF SEISMIC SURVEY DESIGNS VIOLATING FREZNEL ZONE CONSTRAINTS

(76) Inventor: Russell R. Opfer, Wheat Ridge, CO (US)

( * ) Notice: Subject to any disclaimer, the term of this patent is extended or adjusted under 35 U.S.C. 154(b) by 513 days.

(21) Appl. No.: 13/491,587

(22) Filed: Jun. 7, 2012

Related U.S. Application Data

(60) Provisional application No. 61/520,272, filed on Jun. 7, 2011, provisional application No. 61/494,365, filed on Jun. 7, 2011.

(51) Int. Cl.
*G01V 1/38* (2006.01)
*G01V 1/00* (2006.01)

(52) U.S. Cl.
CPC ..................... *G01V 1/003* (2013.01)

(58) Field of Classification Search
USPC .......................................................... 367/56
See application file for complete search history.

(56) References Cited

U.S. PATENT DOCUMENTS

| | | | |
|---|---|---|---|
| 4,503,527 A | 3/1985 | Pann | |
| H1693 H | 11/1997 | Thornton et al. | |
| 5,987,387 A * | 11/1999 | Dickens et al. | 702/14 |
| 6,343,256 B1 * | 1/2002 | Winbow et al. | 702/18 |
| 6,691,075 B1 | 2/2004 | Winbow et al. | |
| 6,865,487 B2 * | 3/2005 | Charron | 702/14 |
| 7,944,774 B2 | 5/2011 | Monk et al. | |
| 2004/0068377 A1 * | 4/2004 | Charron | 702/14 |
| 2009/0279386 A1 | 11/2009 | Monk | |
| 2009/0279388 A1 * | 11/2009 | Monk et al. | 367/21 |

OTHER PUBLICATIONS

Alhukail et al., "The correlation distance of incoherent seismic noise in geophone arrays," SEG Las Vegas 2008 Annual Meeting, 2008, pp. 6-10.
Bancroft et al., "Fresnel zones and the power of stacking used in the preparation of data for AVO analysis," 2003 SEG Annual Meeting, Oct. 26-31, 2003, Dallas, Texas, 4 pages.
Bruhl et al., "Short Note: Fresnel zones for broadband data," Geophysics, Mar.-Apr. 1996, vol. 61(2), pp. 600-604.
Buske et al., "Fresnel volume migration of single-component seismic data," Geophysics, Nov.-Dec. 2009, vol. 74(6), pp. WCA47-WCA55.
Denham, J., "Neidell's conjecture considered," The Leading Edge, May 1994, pp. 314-315.
Discussion on: "Fresnel zones for broadband data," by M. Bruhl, G. J. O. Vermeer, and M. Kiehn (Mar.-Apr. 1996, Geophysics, vol. 61, pp. 600-604), Jan.-Feb. 1996, vol. 62(1), p. 381.
Eick et al., "A Decade of Field Trials in the Panhandle of Oklahoma and the Development of ZenSeis™," SEG Houston 2009 International Exposition and Annual Meeting, 2009, 6-10.

(Continued)

*Primary Examiner* — James Hulka
(74) *Attorney, Agent, or Firm* — Margaret Polson; Polson Intellectual Property Law PC

(57) ABSTRACT

A seismic survey design generation method is disclosed for generating seismic survey design data for performing a seismic survey. The survey design data purposefully violates Freznel zone constraints related to source and/or receiver bin sizes by providing exceptionally small bin sizes. In particular, the seismic survey design generation method and apparatus therefor generates seismic survey design data where the Freznel zone constraints are violated in order to obtain enhanced resolution seismic images not possible in the prior art.

13 Claims, 22 Drawing Sheets
(9 of 22 Drawing Sheet(s) Filed in Color)

(56) References Cited

OTHER PUBLICATIONS

Favretto-Cristini et al., "What is a seismic reflector like?" Geophysics, Jan.-Feb. 2009, vol. 74(1), pp. T13-T23.

Hilterman, F., "Interpretative lessons from three-dimensional modeling," Geophysics, May 1982, vol. 47(5), pp. 784-808.

Knapp, R.W., "Fresnel zones in the light of broadband data," Geophysics, Mar. 1991, vol. 56(3), pp. 354-359.

Lindsey, "The Fresnel zone and its interpretive significance," Geophysics: The Leading Edge of Exploration, Oct. 2009, pp. 33-39.

Liu et al., "Sensitivity kernels and Fresnel volumes for transmitted waves," SEG Las Vegas 2008 Annual Meeting, 2008, pp. 3234-3238.

Monk, D., "Fresnel zone binning: Application to 3D seismic fold and coverage assessments," The Leading Edge, Mar. 2009, pp. 288-295.

Monk, D., "Fresnel-zone binning: Fresnel-zone shape with offset and velocity function," Geophysics, Jan.-Feb. 2010, vol. 75(1), pp. T9-T14.

Perez et al., "The quality of the surface-consistency assumption in short-wavelength static correction," Geophysics, Jul.-Aug. 2004, vol. 69(4), pp. 1091-1101.

Robinson et al., "Higher Resolution Seismic Imaging using Holography," SEG Denver 2010 Annual Meeting, 2010, pp. 3811-3824.

Schleicher et al., "Minimum apertures and Fresnel zones in migration and denigration," Geophysics, Jan.-Feb. 1997, vol. 62(1), pp. 183-194.

Sheriff, R.E., "Nomogram for Fresnel-zone calculation," Geophysics, May 1980, vol. 45(5), pp. 968-972.

Spetzler et al., "Tutorial: The Fresnel volume and transmitted waves," Geophysics, May-Jun. 2004, vol. 69(3), pp. 653-663.

Sun et al., "The effect of the Fresnel zone size on AVO analysis for stack data," 2003 SEG Annual Meeting, Oct. 26-31, 2003, Dallas, Texas, 4 pages.

Thore et al., "Fresnel zone effect on seismic velocity resolution," Geophysics, Mar.-Apr. 1999, vol. 64(2), pp. 593-603.

Thore et al., "Velocity resolution: the Fresnel zone concept," SEG Expanded Abstracts, 1996, vol. 15, pp. 1670-1673.

Website entitled, "Kingdom," at http://www.seismicmicro.com/products/advanced/kingdomadvanced.asp, 2012, 3 pages.

Website entitled, "ProMAX® Family Seismic Data Processing Software," at http://www.halliburton.com/ps/Default.aspx?navid=221&pageid=862, 2012, 3 pages.

Williamson, P.R., "A guide to the limits of resolution imposed by scattering in ray tomography," Geophysics, Feb. 1991, vol. 56(2), pp. 202-207.

Xueqiang et al., "Seismic acquisition methods for improving signal-to-noise ratio in Tadong Desert area," SEG Houston 2009 International Exposition and Annual Meeting, 2009, pp. 176-180.

\* cited by examiner

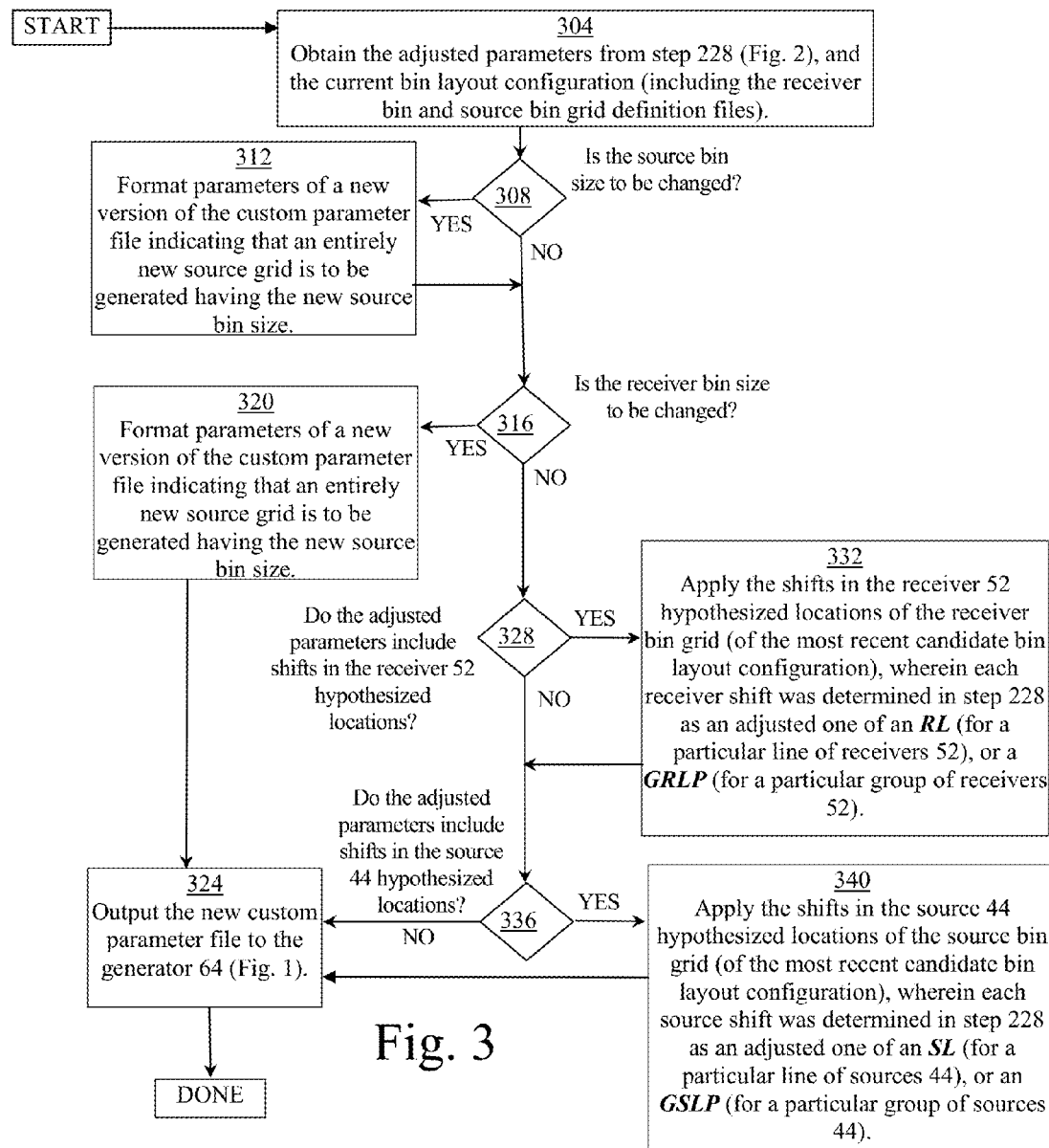

Fig. 7  Output from survey design data generator 40 for input to the generator 64 calculator: 4,000

| sub group ft | # / mile | bin size ft | SRC group ft | SRC line ft | RCVR group ft | RCVR line ft | # ZZ lines/ mile | # RCVR /mi * not including edge | # SRC /mi | Pt increase | RCVR | SRC | ?sqr. mi |
|---|---|---|---|---|---|---|---|---|---|---|---|---|---|
| 24 | 220 | 24.0 | 72 | 288 | 86.5 | 288 | 18.3 | 880 | 587 | 129.2% | 3740 | 25567 | |
| 30 | 176 | 30.0 | 90 | 360 | 108.2 | 360 | 14.7 | 704 | 469 | 83.3% | 2992 | 2053 | |
| 32 | 165 | 32.0 | 96 | 384 | 115.4 | 384 | 13.8 | 660 | 440 | 71.9% | 2805 | 1925 | |
| 33 | 160 | 33.0 | 99 | 396 | 119.0 | 396 | 13.3 | 640 | 427 | 66.7% | 2720 | 1867 | |
| 36.66 | 144 | 36.7 | 110.0 | 439.9 | 132.2 | 439.9 | 12.0 | 576 | 384 | 50.0% | 2448 | 1680 | |
| 40 | 132 | 40.0 | 120 | 480 | 144.2 | 480 | 11.0 | 528 | 352 | 37.5% | 2244 | 1540 | |
| 44 | 120 | 44.0 | 132 | 528 | 158.6 | 528 | 10.0 | 480 | 320 | 25.0% | 2040 | 1400 | |
| 48 | 110 | 48.0 | 144 | 576 | 173.1 | 576 | 9.2 | 440 | 293 | 14.6% | 1870 | 1283 | |
| 55 | 96 | 55 | 165 | 660 | 198 | 660 | 8 | 384 | 256 | 0 | 1632 | 1120 | |
| 60 | 88 | 60.0 | 180 | 720 | 216.3 | 720 | 7.3 | 352 | 235 | -8.3% | 1496 | 1027 | |
| 62.86 | 84 | 62.9 | 188.58 | 754.32 | 226.6 | 754.32 | 7.0 | 336 | 224 | -12.5% | 1428 | 980 | |
| 66 | 80 | 66.0 | 198 | 792 | 238.0 | 792 | 6.7 | 320 | 213 | -16.7% | 1360 | 933 | |
| 73.33 | 72 | 73.3 | 220.0 | 880.0 | 264.4 | 880.0 | 6.0 | 288 | 192 | -25.0% | 1224 | 840 | |
| 88 | 60 | 88.0 | 264 | 1056 | 317.3 | 1056 | 5.0 | 240 | 160 | -37.5% | 1020 | 700 | |
| 96 | 55 | 96.0 | 288 | 1152 | 346.1 | 1152 | 4.6 | 220 | 147 | -42.7% | 935 | 642 | |
| 110 | 48 | 110.0 | 330 | 1320 | 396.6 | 1320 | 4.0 | 192 | 128 | -50.0% | 816 | 560 | |

*These receiver values in bold exceed cable take out distances. For wireless recording systems there are no receiver spacing limits.*

GENERATION AND USE OF SEISMIC SURVEY DESIGNS VIOLATING FREZNEL ZONE CONSTRAINTS

RELATED APPLICATIONS

The present application claims the benefit of U.S. Provisional Patent Application Ser. No. 61/520,272 filed Jun. 7, 2011, and U.S. Provisional Patent Application 61/494,365 filed Jun. 7, 2011, each of these two provisional patent applications being fully incorporated herein by reference.

RELATED FIELD OF THE INVENTION

The present application relates to seismic data processing techniques for obtaining and processing seismic site survey trace data resulting from surface generated seismic signals reflected from underground geologic formations, and in particular, for obtaining such trace data by from seismic site surveys configured to purposely violate Freznel zone constraints.

BACKGROUND

Data for imaging underground geologic formations is used to locate various deposits of, e.g., oil, gas, water, as well as various precious metal and mineral deposits. However, to obtain such data, seismic surveys of the geologic underground formations is typically required. However, such seismic surveys are time consuming and expensive. Moreover, such surveys become more expensive as the bin sizes for the seismic signal sources and receivers decrease.

It is well known in the geophysical industry that there are limits to the resolution of seismic data obtained from performing a seismic survey, and such limits are well known to be dictated by the Fresnel zone constraints as such are applied to the survey site and the underground depth to be imaged. Provided in Appendix A herein is a collection of prior art references that assert that the Fresnel zone constraints are the limiting factor on the resolution that can obtain in transforming seismic survey data to a corresponding seismic image wherein geologic features at great depths can be resolved. In particular, it is well known in the seismic survey art that if high enough signal frequencies are transmitted into the ground at great depths, the constraints asserted by the Freznel Zone are presumed to be limits as to the extent that such seismic data can be effectively noise reduced and resolution enhanced as one skilled in the art will understand.

Accordingly it would be advantageous to have a method and system for enhancing seismic data obtained from a seismic survey wherein additional resolution beyond what would be dictated by the Fresnel zone constraints even though the seismic survey may be substantially more expensive to perform.

Definitions
Super stack: A method of summing adjacent bins in larger bins which will decrease spatial resolution and increase fold.
Fold: The number of traces that are summed into a single summed trace, wherein the summed traces are received from a single receiver bin. As an example, if the bin size is 15 feet (on each side of rectangular bins), and there are 10 traces received in each receiver bin, then binning the trace data into 30 foot bins yields a fold of 40, and binning the trace data into 45 foot bins yields a fold of 90.
Seismic Signals: Downwardly propagated in ground signals generated at one or more predetermined surface sources, wherein such signals (e.g., shock waves) are purposefully generated at the source(s) so that the reflections of such signals (these reflection also denoted as "traces" herein) from one or more subsurface geologic formations are detected by receivers positioned relative to the source(s) at a predetermined surface locations for thereby detecting these reflections.
Trace: A reflection of seismic signals from a single source that is received at single receiver.
Trace Data: Data obtained from one or more traces for use in modeling or imaging underground geologic formations or structures.
Common Depth Points: Subsurface reflection points of seismic signals, wherein these reflection points are presumed to be at a substantially common in ground depth. For a given pair of a seismic signal source and a seismic signal receiver, such Common Depth Points for this pair are presumed to be generally midway between the source and receiver of the pair. Common Depth Points are also referred to as "common mid-points" in the art.
Regular Pattern of Common Depth Points: A desired pattern in the traces for common depth points of a given subsurface depth. In particular, the pattern is expected to have a substantially uniform resolution at the given depth.

SUMMARY

A seismic survey design generation method is disclosed for the generation of seismic survey design data from which data defining an actual seismic survey is determined. In particular, the generation of such seismic survey design data violates fundamental tenants, well known in the art, regarding how to design such surveys. Additionally disclosed herein are methods and computational equipment (e.g., computer system(s)) for utilizing the seismic survey design data generated for defining an actual seismic survey, performing the corresponding seismic survey, capturing the seismic data (traces) therefrom, and processing such seismic trace data to obtain seismic images that lend themselves to far better interpretation by, e.g., seismic analysts, than has heretofore been available. In particular, the presently disclosed seismic survey design generation method and apparatus therefor generates seismic survey design data where the Freznel zone constraints are violated in order to obtain enhanced resolution seismic images not possible in the prior art.

According to the Freznel zone constraints/equations, it was heretofore deemed inappropriate and indeed foolish (as well as completely improper) to perform such seismic surveys with bin sizes less than 110 feet for the survey site (from which the present images were derived). In particular, to incur the expense and time to survey this site with a bin size less than 110 feet would likely incur ridicule. The presently disclosed seismic survey design generation method, apparatus therefor and seismic computer systems also used for generating resulting seismic images purposely violates the Freznel zone constraints.

Various geological survey experiments were conducted to determine if a high-resolution, Freznel constraint violating, seismic survey would be able to image faults and fracture patterns with sufficient resolution to be used for, e.g., geosteering a horizontal well ahead of the drill bit. Accordingly, an initial seismic survey was designed with a survey bin size of 15 feet (i.e., 15 feet by 15 feet) which is significantly smaller than what the Freznel zone seismic resolution calculations dedicate should be used for the seismic survey signal sources being positioned on the ground surface providing a maximum frequency of 95 Hz for imaging a geologic reflector formation at 7200 feet below the surface of the ground. After extensive field tests and analysis seismic survey results, it was determined that for seismic survey signal frequencies at or below 90 Hz, the Freznel zone equations/constraints, for dedicating seismic signal source and bin sizes to achieve optimum likely seismic image resolution, can be significantly violated. In particular, substantially enhanced resolution of seismic survey images were determined achievable by substantially reducing the source and/or receiver bin sizes. The disclosure hereinbelow describes the novel aspects resulting from the field tests and seismic analysis thereof.

Thus, the present disclosure demonstrates that the mathematics based on the Freznel zone theory is incorrect. Therefore the seismic survey design generation method and system for performing seismic data collection and processing the resulting seismic (trace) data therefrom constitute a teaching away from the standard seismic surveying, data processing and imaging techniques and methods in the prior art.

In one embodiment, the seismic survey design generation method for generating a seismic survey design for positioning a plurality of seismic signal sources and a plurality of seismic signal receivers comprises the following steps (A) through performed by computational equipment:

(A) determining, by computational equipment, a smallest source or receiver bin size for performing an actual seismic survey corresponding to the seismic survey design, the actual seismic survey being for surveying a predetermined survey site;
  wherein the smallest source or receiver bin size is at least fives times smaller than a smallest corresponding bin size dictated by Freznel zone constraints for the survey site and for a predetermined depth beneath the surface of the survey site;

(B) generating a candidate bin layout configuration using the smallest source or receiver bin size, wherein the candidate bin layout configuration includes data for positioning the sources and the receivers on the surface of the survey site;
  wherein an acceptability of the candidate bin layout configuration, is determined, the acceptability being dependent upon one of: (i) whether the candidate bin layout configuration is likely to yield a regular pattern of common depth points from seismic trace data received at the receivers, (ii) whether there is likely to be at least a predetermined minimum number of traces received at each of the receivers, wherein the traces are effective for seismic image processing, and (iii) whether the candidate bin layout configuration is likely to be effective in imaging geologic formations beneath the survey site at the predetermined depth;

(C) determining an additional source or receiver bin size, wherein the additional source or receiver bin size is also at least five times smaller than the smallest source of receiver bin size, but the additional source or receiver bin size is no larger than the smallest corresponding bin size dictated by Freznel zone constraints for the survey site and for the predetermined depth beneath the surface of the survey site;

(D) generating an additional candidate bin layout configuration using the additional source or receiver bin size, wherein the additional candidate bin layout configuration includes data for repositioning one or more the sources and the receivers on the surface of the survey site;

(E) recording a position on the survey site where each of the sources and each of the receivers is positioned, wherein the additional candidate bin layout configuration is used to position the sources and receivers at the survey site;

(F) recording at the receivers corresponding seismic trace data received at the receivers, for each of the sources, the trace data including data indicative of a detected reflection from seismic signals generated by the source together with identifications of the source and receiver that detected the reflection;
  wherein the recorded positions of the sources, the recorded positions of the receivers, and seismic trace data is input to a seismic data processing computer system for generating subsurface seismic image data of the geologic formations beneath the survey site at the predetermined depth; and
  wherein the seismic image data is displayed as a model of one or more geologic formations at the predetermined depth, the displayed model used for identifying or detecting the geologic formations.

This Summary section is neither intended to be, nor should be, construed as being representative of the full extent and scope of the present disclosure. Additional benefits, features and embodiments of the present disclosure are set forth in the attached figures and in the description hereinbelow, and as described by the claims. Accordingly, it should be understood that this Summary section may not describe all of the aspects and embodiments claimed herein.

Additionally, the disclosure herein is not meant to be limiting or restrictive in any manner. Moreover, the present disclosure is intended to provide an understanding to those of ordinary skill in the art of one or more representative embodiments supporting the claims. Thus, it is important that the claims be regarded as having a scope including constructions of various features of the present disclosure insofar as they do not depart from the scope of the methods and apparatuses consistent with the present disclosure (including the originally filed claims). Moreover, the present disclosure is intended to encompass and include obvious improvements and modifications of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 is a flowchart providing more details as to steps performed by the step 214 of FIG. 2.

FIG. 7 shows part of a representative output from the survey design generator 40 which is input to generator 64 (FIG. 1). This output includes outputs a range of bin sizes that are useful for generating seismic surveys that will fit within the mile land grid in the United States (see note and color coding in the lower portion of the figure) as one of skill in the art will understand. Also noted in red text, the receiver (RCVR) cable take-out distances that exceed "standard" cable take-out distances used by current wired land seismic recording system 80 is shown. This limitation is not constrained by cable less or wireless seismic recording systems 80 (FIG. 1).

FIG. 11 is additionally annotated to show trace reflective faults in the "Niobrara" geologic formation at a depth of 7200 feet.

DETAILED DESCRIPTION

Figure 1:
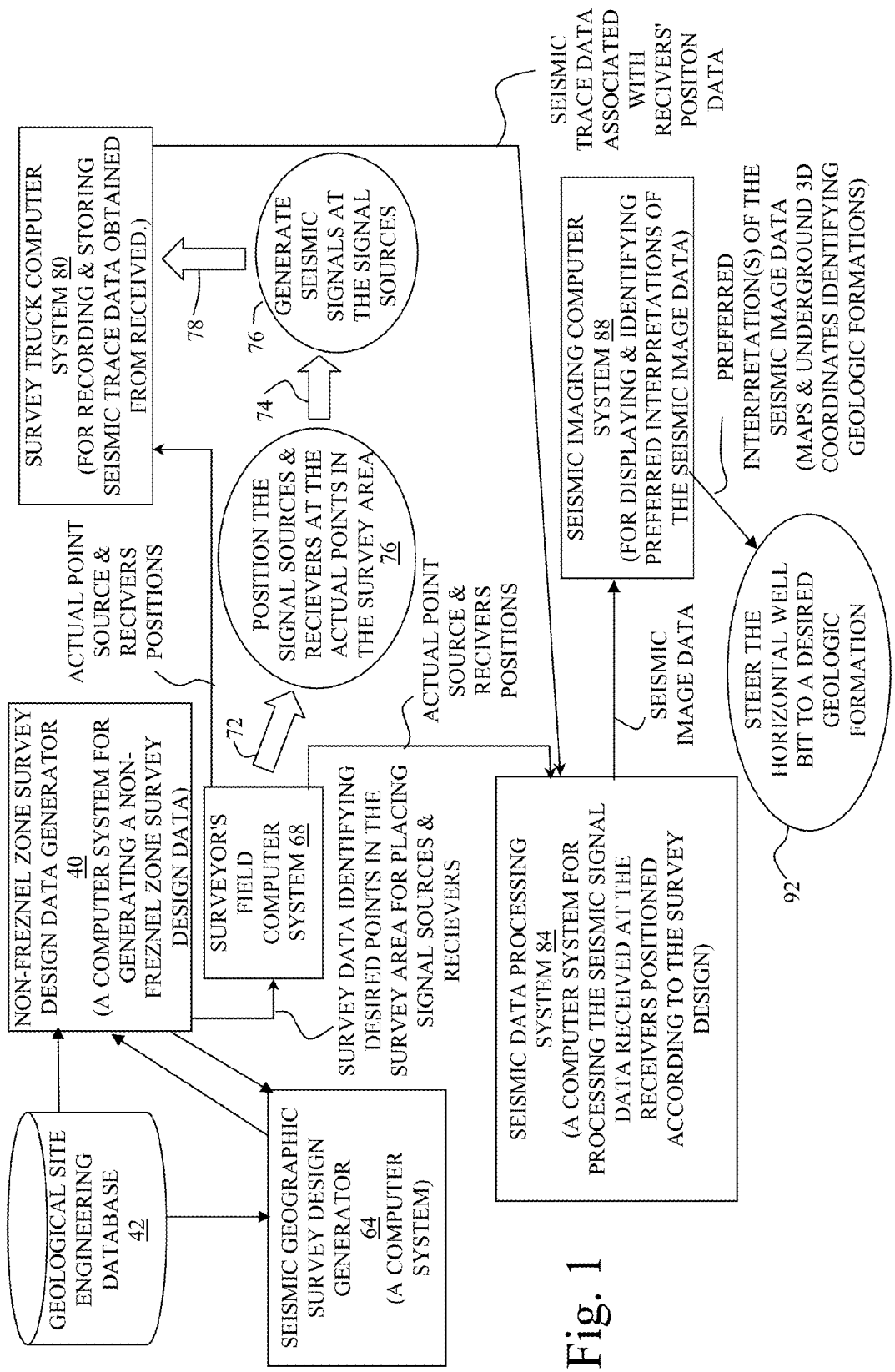
FIG. 1 is a block diagram showing the components related to generating seismic survey data and the same according to the present disclosure.

For the purposes of promoting an understanding of the principles of the present disclosure, reference will now be made to the exemplary embodiments represented in the figures, and described hereinbelow.

Appearances of the phrases an "embodiment," an "example," or similar language in this specification may, but do not necessarily, refer to the same embodiment, to different embodiments, or to one or more of the figures. The features, functions, and the like described herein are considered to be able to be combined in whole or in part one with another as the claims and/or art may direct, either directly or indirectly, implicitly or explicitly.

The various computer systems, system components, and/or modules discussed herein may include one or more of the following: a host server or other machine computing systems including a processor for processing digital data; a memory coupled to the processor for storing digital data; an input digitizer coupled to the processor for inputting digital data; an application program stored in one or more machine data memories and accessible by the processor for directing processing of digital data by the processor; a display device coupled to the processor and memory for displaying information derived from digital data processed by the processor; and a plurality of databases or data management systems.

The present disclosure may be described herein in terms of functional block components, screen shots, user interaction descriptions, optional selections, various processing steps, and the like. It should be appreciated that such descriptions may be realized by any number of hardware and/or software components configured to perform the functions described. Accordingly, to implement such descriptions, various integrated circuit components, e.g., memory elements, processing elements, logic elements, look-up tables, and the like may be used, which may carry out a variety of functions under the control of one or more microprocessors or other control devices. Similarly, the software elements of the present disclosure may be implemented with any programming or scripting language such as C, C++, Java, COBOL, assembler, PERL, Visual Basic, SQL Stored Procedures, AJAX, extensible markup language (XML), Flex, Flash, with the various algorithms being implemented with any combination of data structures, objects, processes, routines or other programming elements. Further, it should be noted that embodiments in the present disclosure may employ any number of conventional techniques for data transmission, signaling, data processing, network control, and the like as one skilled in the art will understand. Embodiments of the present disclosure may also include detection or prevention of security issues using various techniques.

Additionally, many of the functional units and/or modules herein may be described as being "in communication" with other functional units and/or modules. Being "in communication" refers to any manner and/or way in which functional units and/or modules, such as, but not limited to, computers, laptop computers, and other types of hardware and/or software, may be in communication with each other. Some non-limiting examples include communicating, sending, and/or receiving data and metadata via: a network, a wireless network, software, instructions, circuitry, phone lines, Internet lines, satellite signals, electric signals, electrical and magnetic fields and/or pulses, and/or so forth.

Communication among the parties in accordance with the present disclosure may be accomplished through any suitable communication channels, such as, for example, a telephone network, an extranet, an intranet, Internet, online communications, off-line communications, wireless communications, transponder communications, local area network (LAN), wide area network (WAN), networked or linked devices and/ or the like. Moreover, although the disclosure may be implemented with TCP/IP communications protocols, embodiments of the disclosure may also be implemented using IPX, Appletalk, IP-6, NetBIOS, OSI or any number of existing or future protocols. Specific information related to the protocols, standards, and application software utilized in connection with the Internet is generally known to those skilled in the art and, as such, need not be detailed herein.

As used herein, "comprising," "including," "containing," "is," "are," "characterized by," and grammatical equivalents thereof are inclusive or open-ended terms that do not exclude additional unrecited elements or method steps unless explicitly stated otherwise.

A suitable application program can implement software residing on computer-readable medium or media and embodying the various aspects of the method discussed herein and shown in the figures, and can be coded using any suitable programming or scripting language. However, it is to be understood that the disclosure as described herein is not dependent on any particular operating system, environment, or programming language. Illustrative operating systems include without limitation LINUX, UNIX, or any of the Windows-family of operating systems, and illustrative languages include without limitation a variety of structured and object-oriented languages such as C, C++, Visual Basic, or the like.

As those skilled in the art will understand, the program of instructions can be loaded and stored onto a program storage medium or device readable by a computer or other machine, embodying a program of instructions executable by the machine to perform the various aspects of the invention as discussed and claimed herein, and as illustrated in the drawing figures. Generally speaking, the program storage medium can be implemented using any technology based upon materials having specific magnetic, optical, semiconductor or other properties that render them suitable for storing computer-readable data, whether such technology involves either volatile or non-volatile storage media. Specific examples of such media can include, but are not limited to, magnetic hard or floppy disks drives, optical drives or CD-ROMs, and any memory technology based on semiconductors or other materials, whether implemented as read-only or random access memory. In short, this embodiment of the invention may reside either on a medium directly addressable by the computer's processor (main memory, however implemented) or on a medium indirectly accessible to the processor (secondary storage media such as hard disk drives, tape drives, CD-ROM drives, floppy drives, or the like). Consistent with the above teaching, program storage device can be affixed permanently or removably to a bay, socket, connector, or other hardware provided by the cabinet, motherboard, or other component of a given computer system.

Those skilled in the art will also understand that a computer programmed in accordance with the above teaching using known programming languages provides suitable means for realizing the various functions, methods, and processes as described and claimed herein and as illustrated in the drawing figure attached hereto.

Those skilled in the art, when reading this description, will understand that unless expressly stated to the contrary, the use of the singular or the plural number herein is illustrative, rather than limiting, of the instant invention. Accordingly, where a given term is discussed in the singular number, it will be well understood that the invention also contemplates a plural number of the item corresponding to the given term and vice versa, unless expressly stated herein to the contrary.

In order to provide better understanding of the present disclosure, the following U.S. Patents, U.S. Patent Application Publication and U.S. Statutory Invention Registration fully incorporated by reference herein:

(a) U.S. Pat. No. 4,503,527 by Pann filed Feb. 9, 1984. This patent is directed to seismic exploration, wherein seismic reflection signals are obtained along a line of exploration. These seismic reflection signals are time shifted to correct for moveout caused by horizontal dipping and diffraction subsurface events. These connected signals are stacked with a dip independent velocity parameter to provide a zero source-to-receiver seismic record section enhanced in signal-to-noise ratio (b) U.S. Pat. No. 6,691,075 by Winbos, et al. filed Mar. 9, 2000. This patent discloses a model seismic image of a subsurface seismic reflector is constructed, wherein a set of source and receiver pairs is located, and a subsurface velocity function is determined. Specular reflection points are determined on the subsurface seismic reflector for each of the source and receiver pairs. A Fresnel zone is determined on the subsurface seismic reflector for each of the specular reflection points, using the subsurface velocity function. One or more seismic wavelets are selected and a set of image points is defined containing the subsurface seismic reflector. A synthetic seismic amplitude is determined for each of the image points by summing the Fresnel zone synthetic seismic amplitude for all of the Fresnel zones that contain the image point, using the seismic wavelets. The model seismic image of the subsurface seismic reflector is constructed, using the synthetic seismic amplitudes at the image points.

(c) U.S. Pat. No. 7,944,774 by Monk, et al. filed Mar. 24, 2009. This patent is directed to a method for marine seismic surveying including towing seismic sensors in a plurality of streamers in the water, actuating a seismic energy source in the water at selected times and detecting seismic signals at the sensors resulting from the actuation of the source. A data trace is created for each of the detected signals. At least one Fresnel zone is determined for at least some of the seismic data traces. A contribution of each of the traces to each one of a plurality of bins defined in a predetermined pattern is computed, based on the Fresnel zone associated with each trace. Based on the computed contributions, a maximum lateral distance between corresponding seismic sensors is determined that will result in a contribution sum above a selected threshold.

(d) U.S. Patent Publication No. 20090279386 by Monk filed May 7, 2008. This patent application publication discloses a method for assessing data coverage in a three dimensional marine seismic survey including a step of determining at least one Fresnel zone for at least one of a plurality of seismic data traces. A contribution is determined for each of the seismic data traces to each one of a set of bins in a defined pattern. Each contribution is based on the Fresnel zone associated with each seismic data trace. The contributions from all seismic data traces contributing to each bin are summed. The summed contribution for each bin are stored or displayed and the summed contributions in each bin are compared to a selected threshold to determine coverage.

(e) U.S. Statutory Invention Registration No. H1693 by Thornton filed Nov. 12, 1996. The present statutory invention registration discloses a method for removing non-geologic amplitude variations from seismic data. The method is based on the premise that lateral amplitude variations with spatial wavelengths shorter than the width of the Fresnel zone, a known wave propagation effect, for the target cannot be caused by changes in the reflectivity of the target and must, therefore, be due to non-geologic causes. The method permits these non-geologic amplitude effects to be identified and removed from the seismic data. The method may be implemented either manually or automatically by a computer.

Additionally, to further assist in understanding the present disclosure and its importance, Appendix A hereinbelow includes a large number of seismic data processing technical references for teaching or implying that a seismic survey design having source 44 and/or receiver 52 grid spacing below what is dedicated by the Fresnel zone constraints are unnecessary and/or should not be violated.

As discussed in the above Summary section, the description herein for enhancing seismic survey image resolution is substantially directed to seismic signal frequencies at or below 90 Hz. In particular, the description hereinbelow is for seismic signal generating sources (44) generating seismic signal frequencies at or below 90 Hz, and for corresponding seismic receivers (52) subsequently detecting reflections thereof. Moreover, it is believed that enhanced seismic survey image resolution according to the method and computational equipment disclosed in, e.g., FIGS. 1-3 and the description thereof herein, is particularly achievable for frequencies in the range of 50 to 90 Hz. Thus, for the description hereinbelow, it is assumed unless stated otherwise, the seismic signal frequencies of seismic signals generated and detected is in a range of less than 95 Hz, and more particularly, in the range of 50 to 90 Hz.

FIG. 1 shows a block diagram illustrates the computational (computer and/or network) systems within which the novel seismic survey design data is generated and used, wherein such survey design data purposely violates the Freznel Zone constraints. Note that each of the components identified as a "computer system" includes a hardware/software combination operatively configured as a particular computational machine for performing specific seismic computational tasks. In particular, as one skilled in the art will understand, each such computer system typically includes a central processing unit (CPU), a random access memory (RAM), a mass or peripheral persistent data storage, a display device (e.g., a computer monitor), one or more user input devices (e.g., a keyboard, a selection/pointing device, etc.), a software operating system, and specialized installed software for performing the particular seismic related tasks attributed herein to the computer system Note, some of the computer systems identified herein may be distributed over a network such that various of the above listed computer components may not reside at a same location; but instead such a computer system may be specifically configured to access and/or activate various of its components via a communications network such as the Internet.

Figure 2:
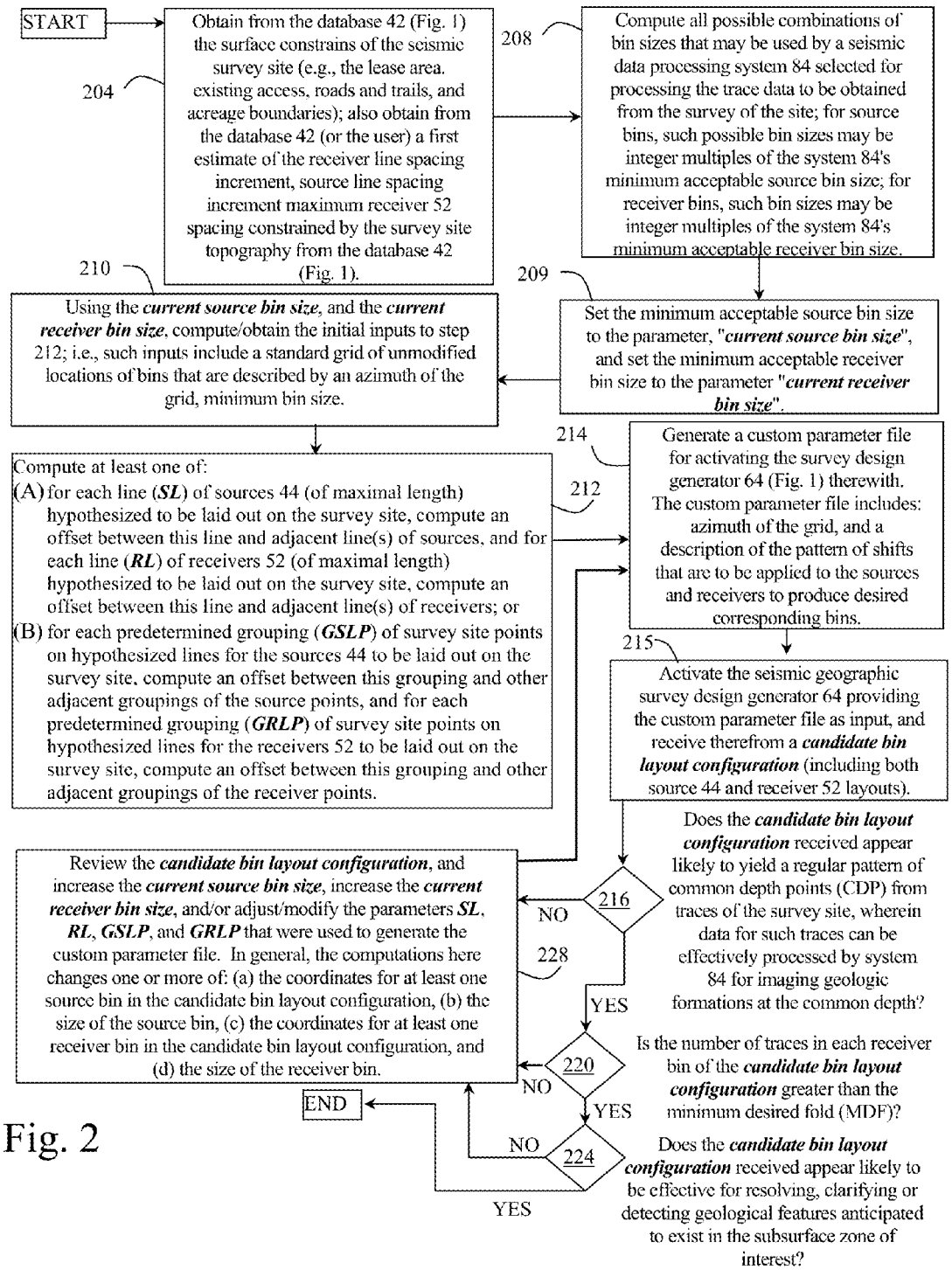
FIG. 2 is a flowchart disclosing the steps performed by the non-Freznel Zone survey design data generator 40 of FIG. 1.

In FIG. 1, a non-Freznel Zone survey design generator 40 generates survey design data purposely violates the Freznel Zone constraints according to the flowchart of FIG. 2 when the generator 40 receives input geological input related to, e.g., the topography of the geographical area to have its underground geological formations surveyed. Such input may be received from a persistent electronic data storage (e.g., geological site engineering database 42 in FIG. 1) such as a relational database and/or at least partially from manual input by data input personnel. In one embodiment, the input data includes: a depth of a geologic formation to be modeled, a surface topography of the survey site, a location of (any) existing wells, time to depth signal propagation velocity information, and historical seismic processing parameters.

The generator 40 generates non-Freznel Zone survey design data (e.g., as partially represented in FIG. 7 as described hereinbelow) for positioning: (i) seismic signal generating sources 44, e.g., data for describing geographic positions of the sources in FIG. 9 along the lines 48 of smaller dots, wherein each such source is represented by one of the smaller dots, and (ii) signal receivers 52, e.g., data for describing geographic positions of the receivers in FIG. 9 along the zigzag lines 56 of larger black dots, wherein each such receiver is represented by one of the larger black dots that detect the source signals when they are reflected from various underground geological formations (such reflected signals referred to as "traces" herein). In particular, the generator 40 generates source 44 positions and relative receive 52 positions that are much closer together than any known prior art seismic survey design systems by purposefully violating the fundamental Freznel Zone seismic design constraints, wherein such constraints, e.g., dictate that no additional resolution of underground seismic geological formations or structures can ever be obtained by reducing, below a predetermined corresponding threshold, the disjoint surface ground areas associated with the sources 44 and the receivers 52 (such surface areas known in the art as "bins"; i.e., each such surface area or bin is typically a rectangular subarea of the survey site). For example, such Freznel Zone seismic design constraints may dictate that for sources 44 and receivers 52 spaced apart in separate bins of a given survey site area, any bin size less than 60 feet by 60 feet will yield no greater below ground resolution of geological structures at a depth of 7,500 feet than when all bins are of size 60 feet by 60 feet or greater size. Thus, since such site surveys are typically very expensive to perform, no prior art has developed a computer system to design site surveys that are in violation of the Freznel Zone constraints. Moreover, no one skilled in the art would have been motivated to develop such a computer system since those of any skill in the art would expect that such a system would result in geologic underground surveys that were needlessly expensive. However, other surface arrangements of the sources 44 and the receivers 52 are within the scope of the present disclosure.

Figure 9:
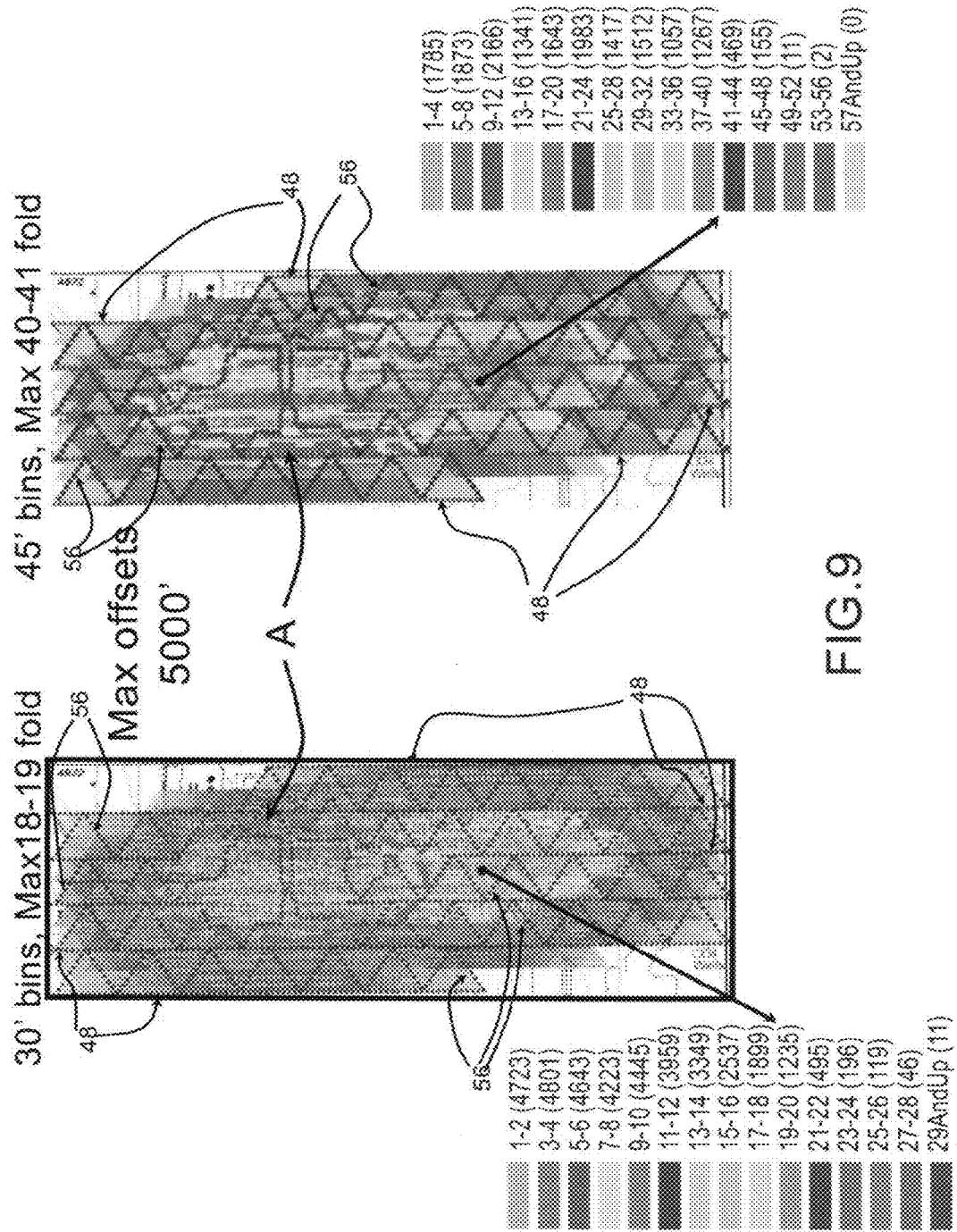
FIG. 9 shows an example of a fold plot of a seismic survey (output by the generator 64 and/or the field computer 68) that was designed and processed according to the flowcharts shown in FIGS. 2 and 3. Two fold maps are shown in FIG. 9; the one on the left is a fold map of the same data processed using a 30-foot bin "superbinning". The map on the right in FIG. 9 is a fold map of the same seismic trace data processed with the 30-foot bin spacing.

In one embodiment of the generator 40, the resulting survey data for identifying desired site locations of the sources 44 and the receivers 52 includes long lines 48 of sources 44 (as shown in FIG. 9 lines of dots or triangles), and zigzag patterns 56 of receivers 52, wherein the maximum bin size is, e.g., 15 feet by 15 feet, such a bin size being substantially below the bin dictated by the Freznel Zone constraints. In fact, in at least some embodiments of the generator 40, the bin size(s) generated are at least four times below the bin size(s) dictated by the Freznel Zone constraints, and in some embodiments, at least six times below the bin size(s) dictated by the Freznel Zone constraints. Moreover note that it is within the scope of the present disclosure for the generator 44 to generate other arrangements or patterns of the sources 44 and/or the receivers 52 than are shown in the figures identified herein (with their corresponding bin sizes substantially reduced below the bin size(s) dictated by the Freznel Zone constraints).

As shown in FIG. 1, the survey design data (e.g., a custom parameter file) output by the non-Freznel Zone survey design generator 44 to a computer system 64 (denoted a "seismic geographic survey design generator" in FIG. 1) and this seismic geographic survey design generator may reside on the same computer(s) as the generator 40 or on a different computer(s) that is, e.g., networked to the computer(s) that executes the generator 40. In at least some embodiments, the survey design generator 64 is a commercially available software/hardware system, wherein the hardware is typically a workstation class computer that has been specifically configured with at least the seismic specific software known by the trade name GPSeismic® and sold/produced by Trimble having a business address of 935 Stewart Drive, Sunnyvale, Calif. 94085 generating specific latitude and longitude coordinates pairs for identifying where each of the sources 44 and each of the receivers 52 are to be placed within a specific survey site area (note, a description of GPSeismic may be currently obtained from http://www.gpseismic.com/download/manuals/GPSeismic_brochure.pdf). More specifically, the output of the survey design generator 64 (denoted herein as a "candidate bin layout configuration") provides desired or theoretical (near) optimal locations of the sources 44 and receivers 52 as determined according to the survey design output from: (i) the generator 40, and (ii) seismic site data obtained from the engineering database 42 and/or user input. In particular, the survey design generator 64 generates source 44 and receiver 52 positioning locations by performing the following steps: identifying the bounds and orientation of the survey relative to a corresponding land grid and generating or populating source and receiver points with the bounds of the survey and outputting the data in a standard file format as one of skill in the art will understand. Once such a candidate bin layout configuration is generated, it is provided to the generator 40 for determining its acceptability for outputting to the surveyor's field computer system 68 (described immediately below).

The output from the survey design generator 64 having theoretically preferred source 44 and receiver 52 locations is transmitted to field computer system 68 used by a geologic surveyor for identifying and placing the sources 44 and the receivers 52 at locations on the ground in the survey site area, wherein the locations are intended to closely or exactly match the corresponding latitude-longitude pairs output by the survey design generator 64. Note that the actual locations of the sources 44 and receivers 52 may vary from the survey design generator 64 output due to unknown or unexpected surface geological formations such as a rocky outcropping or projection at such a location or a body of water at such a location. As the surveyor (or other personnel) place the sensors 44 and receivers 52 on the survey site, each location therefor is recorded in the field computer system 68 with high accuracy (e.g., according to the accuracy obtained via GPS signals as one of ordinary skill in the art will understand, such accuracy being generally about 1 to 4 meters). Note that the task of positioning the sources 44 and receivers 52 is generally a substantially manual task which is identified in FIG. 1 by the circular task description 72 (with the arrow 76 indicating that the task of 72 requires the utilization of the surveyor's field computer system 68). Note that when the actual source 44 and receiver 52 positions are recorded in the field computer system 68, the field computer system then transmits or provides the recorded data of these actual positions to the seismic data processing system 84 described hereinbelow.

Subsequently (as indicated by the arrow 74), the circular task description 76 (FIG. 1) is performed, wherein the signal sources 44 are activated to generate seismic signals into ground (e.g., via explosive charges, or other seismic in-ground signal wave forming techniques), and their corresponding reflection traces are detected and data therefor is captured by the receivers 52 as one skilled in the art will understand. The trace data captured by the receivers 52 is then (as indicated by arrow 78) transferred/transmitted to a survey truck computer system 80 which is typically also at the survey site. Note that the field computer system 68 also transfers/transmits the actual locations of the sources 44 and the receivers 52 to the survey truck computer system 80. Thus, once the survey truck computer system 80 has received all the inputs from both the field computer system 68 and the receivers 52, the computer system 80 can computationally associate or link the trace data from each receiver 52 with the receiver's corresponding data identifying its geographic location.

Subsequently, the survey truck computer system 80 transfers/transmits the associated or linked seismic data to the seismic data processing computer system 84 for transforming the seismic traces into seismic image related data as one skilled in the art will understand. In particular, an embodiment of the seismic data processing computer system 84 may be a computer hardware/software system wherein at least the seismic specific software therefor is known by the trade name ProMAX® and sold/produced by Halliburton having a business address at 10200 Bellaire Blvd., Houston, Tex. 77072 (note, a description of ProMAX may be currently obtained from http://www.halliburton.com/ps/Default.aspx?navid=221&pageid=862). More specifically, embodiments of the seismic data processing computer system 84 perform the following steps: geometry assignment, static corrections, velocity analysis, common depth point stacking, and migration as one of skill in the art will understand.

Figure 8:
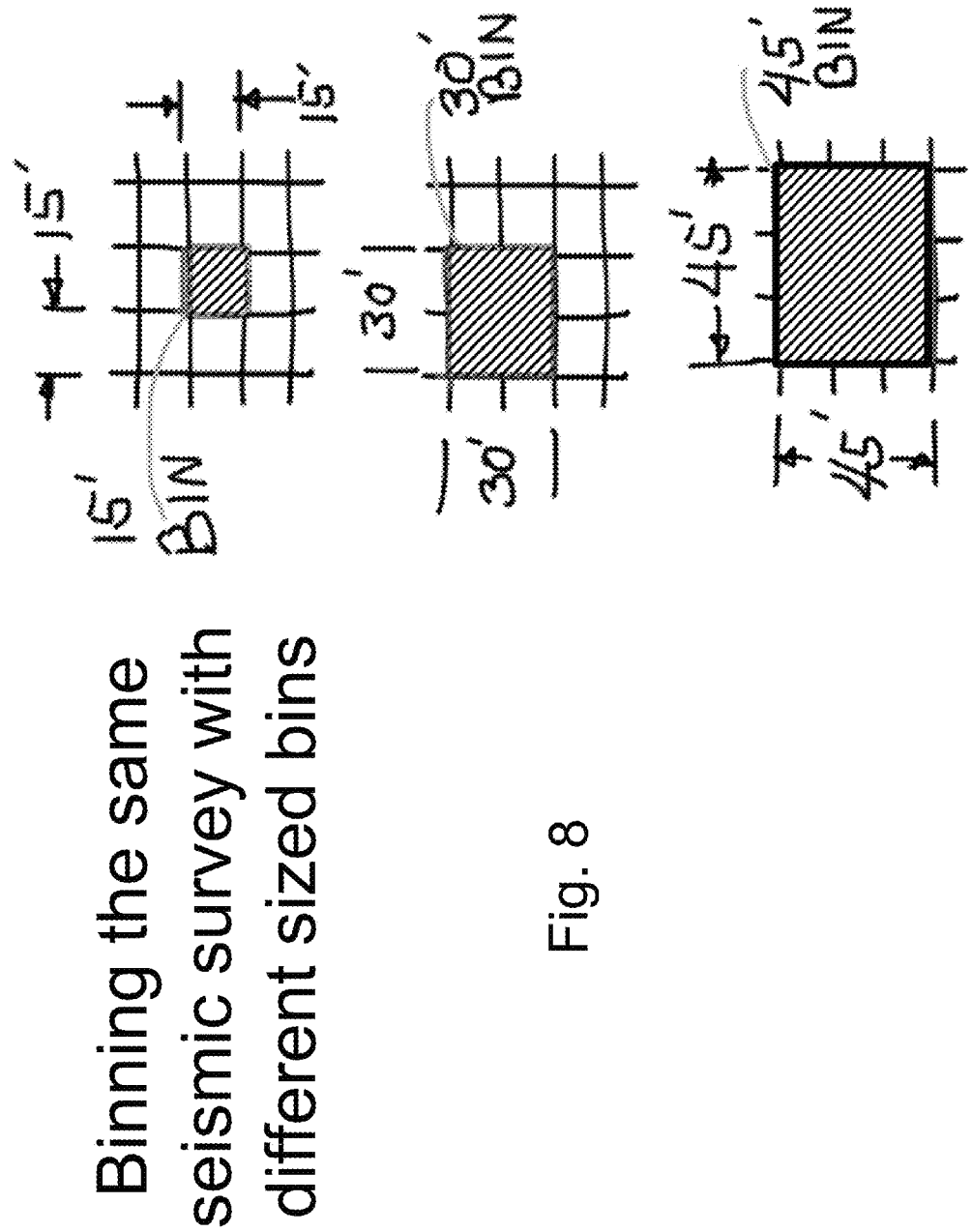
FIG. 8 shows three diagrams that explain the process of "superbinning" which is typically done in seismic data processing system 84 (or in some embodiments, in survey truck computer system 80) during the processing of the seismic trace data acquired according to a non-Freznel zone seismic survey design provided by the generator 40 (FIG. 1). In particular, the uppermost diagram of the three diagrams illustrates an areas of a seismic survey designed with a bin size of 15 feet; the middle diagram illustrates how the area from the uppermost diagram can be superbinned into 30-foot bins, wherein each 30-foot bin includes four adjacent bins of size 15-foot; and the lowermost diagram illustrates how the area from the uppermost diagram can be superbinned into 60-foot bins, wherein each 60-foot bin includes sixteen adjacent bins of size 15-foot.

One skilled in the art will also understand that from the survey site areas are known as "bins", aggregations of such bins into "superbins (as shown in FIG. 8 described hereinbelow)" can be performed by the seismic data processing system 84. In particular, such superbins can be constructed from smaller "bins" wherein such superbins include a plurality of receivers of their smaller bins, and accordingly, for each of the superbins, all the traces captured by the receivers in a superbin is aggregated or combined during seismic data processing by the processing system 84. Thus, the resulting seismic image data for the superbins provides an underground geological representation or model that may be of reduced resolution but of higher reliability (i.e., having a greater likelihood of representing the actual geological formations below the surface). Accordingly, during processing of the captured seismic trace data, various seismic images can be generated by summing adjacent bins of trace data to simulate a survey design with various bin sizes (i.e., superbins) that are larger than the original survey bin size. Note that the processing of the captured seismic trace data according to larger and larger superbin sizes increases the redundancy of traces which is commonly known in the art as the "fold" of the resulting seismic image.

Subsequently, the seismic image data generated by seismic data processing computer system 84 is output to the seismic imaging computer system 88, wherein one or more seismic data analysts (and/or corresponding knowledge based computer "intelligent" agents, e.g., expert systems, etc.) interpret the seismic image data via, e.g., image filtering, convoluting, noise reducing, sharpening techniques as one of ordinary skill in the art will understand. In particular, an embodiment of the seismic imaging computer system 88 may be an interactive computer hardware/software system wherein at least the seismic specific software therefor is known by the trade name Kingdom® and sold/produced by IHS Kingdom having a business address at 8584 Katy Freeway, Suite 400, Houston, Tex. 77024 (note, a description of Kingdom may be currently obtained from http://www.seismicmicro.com/products/advanced/kingdomadvanced.asp). More specifically, embodiments of the seismic data processing computer system 88 perform the following steps: (i) from input seismic processed trace data, image data of the trace data is produced in such a manor to image the subsurface geology, (ii) identify and pick relevant subsurface geologic reflectors, (iii) apply various attributes to the image data to reveal geologic faults and structures in the subsurface, and (iv) generate various time and depth maps of these geological features as one of skill in the art will understand.

Lastly, after one or more preferred interpretations of seismic image data are identified (e.g., such preferred interpretations being seismic maps of underground geological formations or structures, and corresponding geographic coordinates identifying the expected locations of such formations or structures), these preferred interpretations are transferred/transmitted to a well on the survey site (as indicated by the circular task description 92), wherein these preferred interpretations are used to steer the well's drill bit in, e.g., a direction that includes a substantially non-trivial horizontal direction vector component. For example, such a substantially non-trivial horizontal direction may be a drilling direction that is at least 30 degrees from vertical, and more preferably at least 45 degrees from vertical. Note, that the use of such preferred interpretations for directing such horizontal drilling operations is well known to one of ordinary skill in the art.

FIG. 2 is a high level embodiment of a flowchart representing the processing steps and flow of control performed by the generator 40. It is believed that for one of ordinary skill in the art, the steps of FIG. 2 are self-explanatory. However, additional description is now provided. In step 204, the generator 40 requests and receives data describing the actual physical survey site, such data including, e.g., a description of the boundaries and extent(s) of the survey site area(s), the roads at the site, the acreage of the site as well the topography of the site (e.g., elevations and surface gradients, etc.). Additionally, initial estimates are obtained (e.g., from the database 42) for a maximum spacing of the sources 44 and a maximum spacing of the receivers 52 for laying out these sources and receivers on the survey site. Also, input are initial estimates for the spacing between lines of sources 44, and the spacing between lines of sources 52. Note that since virtually all (or all) commercially available seismic data processing systems 84 require (or substantially so) the receivers 44 to be positioned on the survey site are required be positioned along one or more lines, wherein the receiver lines are related to the source lines in predetermined arrangements, e.g., according to the common depth points (CDP) as one skilled in the art will understand.

In step 208, all possible (or candidate) combinations of bin sizes that may be used by a seismic data processing system 84 that has been selected for processing the trace data to be obtained from the survey of the site; for source bins, such possible bin sizes may be integer multiples of the system 84's minimum acceptable source bin size; for receiver bins, such possible bin sizes may be integer multiples of the system 84's minimum acceptable receiver bin size. Note that due to the complexity of seismic data processing of traces, such processing systems 84 typically accept restricted inputs relating to such traces, source bin sizes, receiver bin sizes, and geometric relationships source bins and receiver bins. For example, both source and receiver bins are assumed to be square, and assumed to no smaller than a predetermined size dedicated by the selected data processing system 84. In one embodiment, the minimum bin size (for source bins and/or receiver bins) may be computed by determining the Freznel zone dictated minimum corresponding bin size, and then reducing such bin size by, e.g., at least a factor of five and preferably a factor of at least seven while maintaining the same fold value per receiver bin.

In step 209, the minimum source bin size acceptable to the selected data processing system 84 is assigned to the parameter, "current source bin size", and minimum acceptable to the selected data processing system 84 is assigned to the receiver bin size to the parameter "current receiver bin size".

In step 210, the current source bin size, and the current receiver bin size are used to compute/obtain the initial inputs to compute data for a standard grid of unmodified survey site locations of bins that are described by an azimuth of the grid, minimum bin size as one of skill in the art will understand. In particular, such data for a standard grid is used in step 212 to compute at least one of the following, as one of skill in the art will understand:

(A) for each line (SL) of sources 44 (of maximal length) hypothesized to be laid out on the survey site, compute an offset between this line and adjacent line(s) of sources 44, and for each line (RL) of receivers 52 (of maximal length) hypothesized to be laid out on the survey site, compute an offset between this line and adjacent line(s) of receivers; and (B) for each predetermined grouping (GSLP) of survey site points on hypothesized lines for the sources 44 to be laid out on the survey site, compute an offset between this grouping and other adjacent groupings of the source points, and for each predetermined grouping (GRLP) of survey site points on hypothesized lines for the receivers 52 to be laid out on the survey site, compute an offset between this grouping and other adjacent groupings of the receiver points.

Subsequently, step 214, a custom parameter file is generated for inputting into the survey design generator 64 (FIG. 1). The custom parameter file includes: azimuth of the grid, and a description of the pattern of shifts that are to be applied to the sources 44 and receivers 52 to produce the corresponding desired source bins and receiver bins.

Then in step 215, the seismic geographic survey design generator 64 is activated with the custom parameter file as input for obtaining (as output therefrom) a candidate bin layout configuration that includes both source 44 and receiver 52 layouts for the survey site. Note, that such generators 64 are commercially available as discussed hereinabove and are well known to one skilled in the art.

Subsequently, in step 216, a determination is made as to whether the candidate bin layout configuration obtained from the generator 64 appears likely to yield a regular pattern of common depth points (CDP) from traces of the survey site, wherein data for such traces can be effectively processed by system 84 for imaging geologic formations at the common depth to be imaged. Note that this determination may be performed by an "intelligent system" such as an expert system having a knowledge base for making such determinations. However, in another embodiment, an operator may utilize one or more interactive software tools to assist him/her in making the determination of the present step. For example, such software tools may be the software tools that are contained within the generator 64 embodiment GPSeismic identified hereinabove.

If the candidate bin layout is determined to likely yield a regular pattern of common depth points, then in step 220, a further determination is made as to whether the number of traces likely to be received at each receiver 52 (positioned according to the candidate bin layout configuration) will be greater than the minimum desired fold (MDF) for the site survey as one of skill in the art will understand. Note that this determination may be performed by an "intelligent system" such as an expert system having a knowledge base for making such determinations. However, in another embodiment, an operator may utilize one or more interactive software tools to assist him/her in making the determination of the present step. For example, such software tools may be the tools that are contained within the generator 64 embodiment GPSeismic 64 and mapping software known to those skilled in the art.

If the minimum desired fold is likely to be achieved with the current candidate bin layout configuration, then in step 224, a further determination is made as to whether the candidate bin layout configuration (and in particular, the candidate locations of the sources 44 and receivers 52) appear likely to be effective for resolving, clarifying or detecting geological features, e.g., that are anticipated or presumed to exist in the subsurface zone of interest (e.g., at the common depth point). Note that this determination may be performed by an "intelligent system" such as an expert system having a knowledge base for making such determinations. However, in another embodiment, an operator may utilize one or more interactive software tools to assist him/her in making the determination of the present step. For example, such software tools may be the tools that are contained within the generator 64 embodiment GPSeismic 64 and mapping software known to those skilled in the art.

Subsequently, if the decision step 224 yields a positive result, then the (most recently computed) candidate bin layout configuration is deemed acceptable for outputting to the surveyor's field computer 68, and is therefore output to the survey's field computer system 68 as discussed regarding FIG. 1 hereinabove.

If any of the decision steps 216, 220 or 224 yield a negative result, then step 228 is performed, wherein one or more of the parameters current source bin size, current receiver bin size, SL, RL, GSLP and GRLP are adjusted/modified. In particular, if one or both of the current source bin size and the current receiver bin size are changed, the change will increase it by, e.g., (i) a percentage such as 10% to 50%, or (ii) a fixed value such as adding 10 feet to the correspond bin size, or (iii) some bin size increase that is nonlinear. Additionally, for whichever (if any) of the current source bin size, and/or current receiver bin size is not increased, one of more of the parameters (for one or more lines/groups of sources 44 and/or receivers 52) SL, RL, GSLP and GRLP may be shifted toward or away other lines/groups as one skilled in the art will understand. Note that step 228 may be performed by an "intelligent system" such as an expert system having a knowledge base that is accessed for performing step 228. However, in another embodiment, an operator may utilize one or more interactive software tools to assist him/her in making the determination of the present step. For example, such software tools may be mapping and imaging software tools well known to those skilled in the art.

Subsequently, after step 228 is performed, step 214 is again performed for computing a new candidate bin layout configuration.

Referring now to FIG. 3, this figure shows the steps of a flowchart performed by the step 214 of FIG. 2 for generating each instance of a custom parameter file which is provided as input to the seismic geographic survey design generator 64. Accordingly, in step 304, an instance of the adjusted parameters from step 228 (FIG. 2) is obtained together with the most recently computed (i.e., current) bin layout configuration (including the receiver bin and source bin grid definition files). Subsequently, in decision step 308, a determination is made as to whether the adjusted parameters obtained includes data for specifying that the source bin size is to be changed. Note that typically, if the source bin size is to be changed, it is increased in size, and in particular, the increase is an integer multiple of the current source bin size. Thus, in one embodiment, the source bin size is doubled, and accordingly, the area size of each source bin is quadrupled. However, other increases in the source bin size (and the corresponding increase in source bin area size) are within the scope of the present step. If the current source bin size is to be changed, then in step 312, the generator 40 formats a new version of the custom parameter file with parameter values indicating that an entirely new source grid new specifying source 44 locations for the survey site is to be generated.

Regardless of whether step 308 yields a positive or negative result, the decision step 316 is subsequently performed, wherein a determination is made as to whether the adjusted parameters obtained includes data for specifying that the receiver bin size is to be changed. As with the source bin size, if the receiver bin size is to be changed, it is increased in size, and in particular, the increase is an integer multiple of the current source bin size. Thus, in one embodiment, the receiver bin size is doubled, and accordingly, the area size of each receiver bin is quadrupled. However, other increases in the receiver bin size (and the corresponding increase in receiver bin area size) are within the scope of the present step. If the current receiver bin size is to be changed, then in step 320, the generator 40 formats a new version of the custom parameter file with parameter values indicating that an entirely new receiver grid new specifying receiver 52 locations for the survey site is to be generated. After step 320, step 324 is next performed wherein a new custom parameter file is output to the generator 64 for activating this generator and thereby generating a modified or new candidate bin layout configuration.

Regardless of whether step 316 yields a positive or negative result, the decision step 328 is subsequently performed, wherein a determination is made as to whether the adjusted parameters obtained includes data values for shifting the proposed survey location of one or more receivers 52. If one or more proposed receiver 52 locations are to be shifted, in step 332 the one or more receiver shift values are applied to the corresponding locations of the receivers identified in the adjusted parameters obtained in step 304. More specifically, the shift values obtained may be for shifting a collection of receivers 52 constituting a line of receivers (for the parameter data RL of FIG. 2), or constituting another grouping of receivers (for the parameter data GRLP of FIG. 2). For example, the GRLP parameter data may identify one or more zigzag patterns 56 (as in FIG. 9 described hereinbelow) or another collection of receivers. The RL parameter data may identify, e.g., a receiver 52 straight line segment of one of the zigzag patters in FIG. 9.

Regardless of whether step 328 yields a positive or negative result, the decision step 336 is subsequently performed, wherein a determination is made as to whether the adjusted parameters obtained includes data values for shifting the proposed survey location of one or more sources 44. If one or more proposed source 44 locations are to be shifted, in step 340 the one or more shift values are applied to the corresponding locations of the sources identified in the adjusted parameters obtained in step 304. More specifically, the shift values obtained may be for shifting a collection of sources 44 constituting a line of sources (for the parameter data SL of FIG. 2), or constituting another grouping of sources (for the parameter data GSLP of FIG. 2). For example, the GSLP parameter data may identify one or more sources. The SL parameter data may identify, e.g., a source 44 straight line segment of one of the source lines 48 in FIG. 9.

Regardless of whether step 336 yields a positive or negative result, the decision step 324 is again performed wherein a new custom parameter file is output to the generator 64 for activating this generator and thereby generating a modified or new candidate bin layout configuration.

Figure 4A:
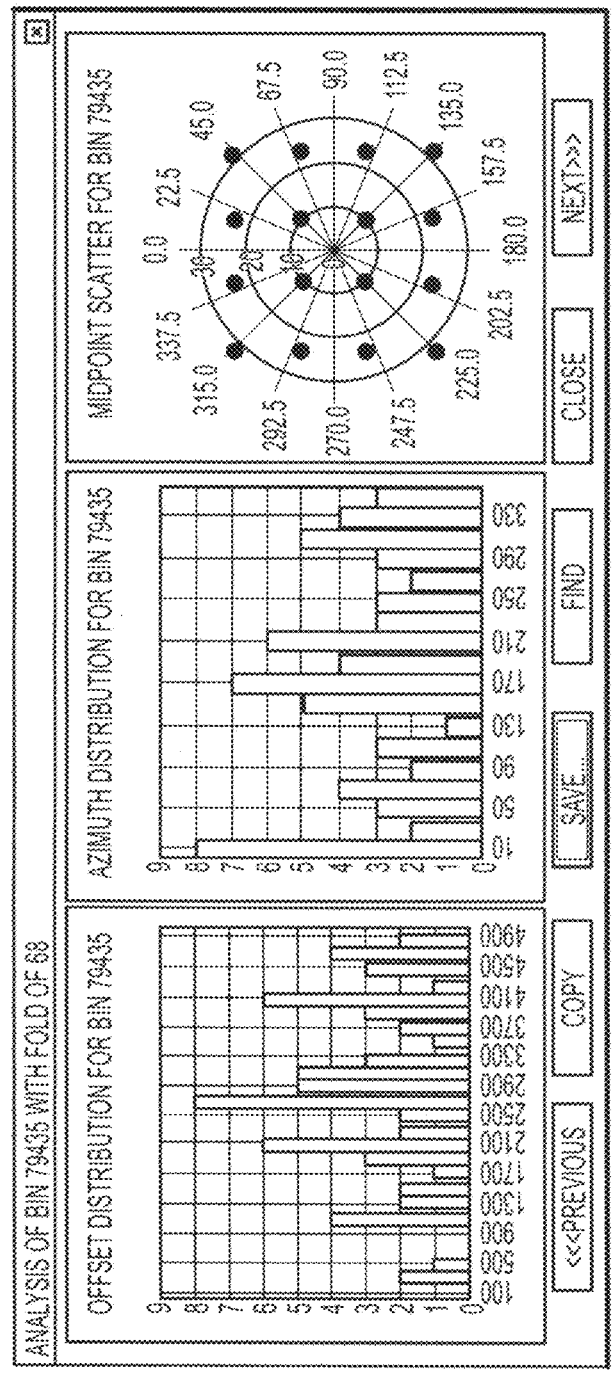
FIGS. 4A-D shows:
(i) a seismic model generated by the seismic geographic survey generator 64 of a theoretical or candidate survey binned with 60-foot sized bins at a depth of 5000 feet (FIG. 4D); and
(ii) each of FIGS. 4A-C shows a histogram and a circular graph representing common depth point positions for the model shown in FIG. 4D.
Figure 4B:
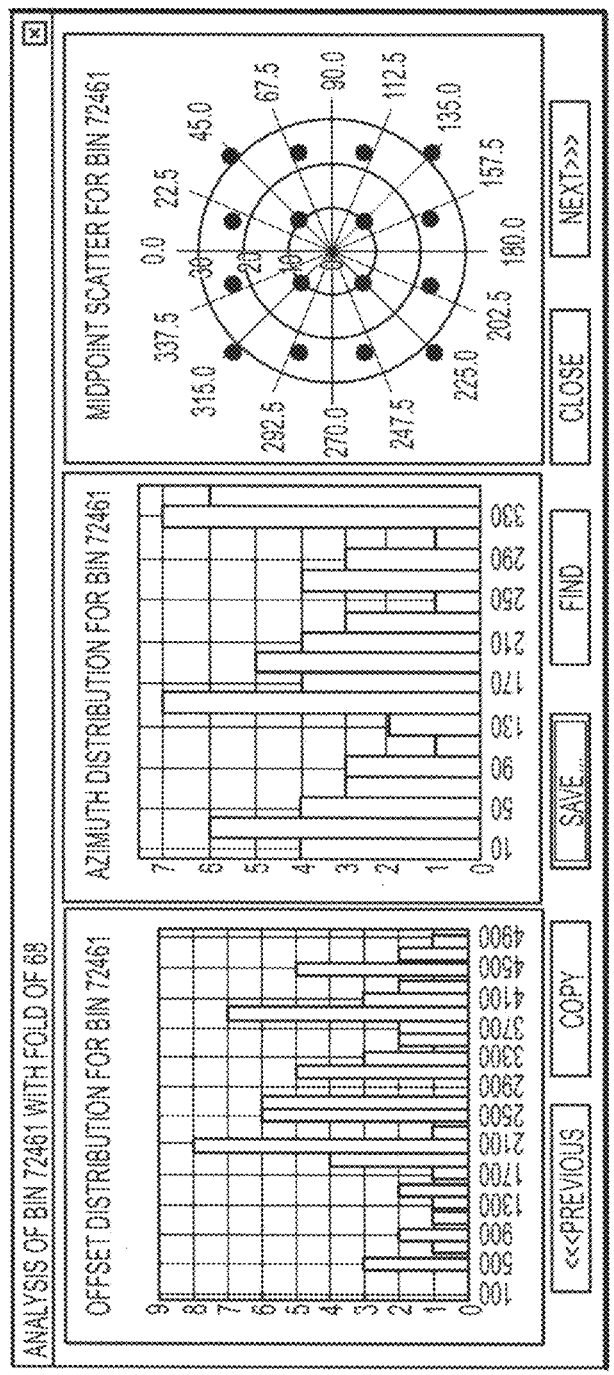
Figure 4C:
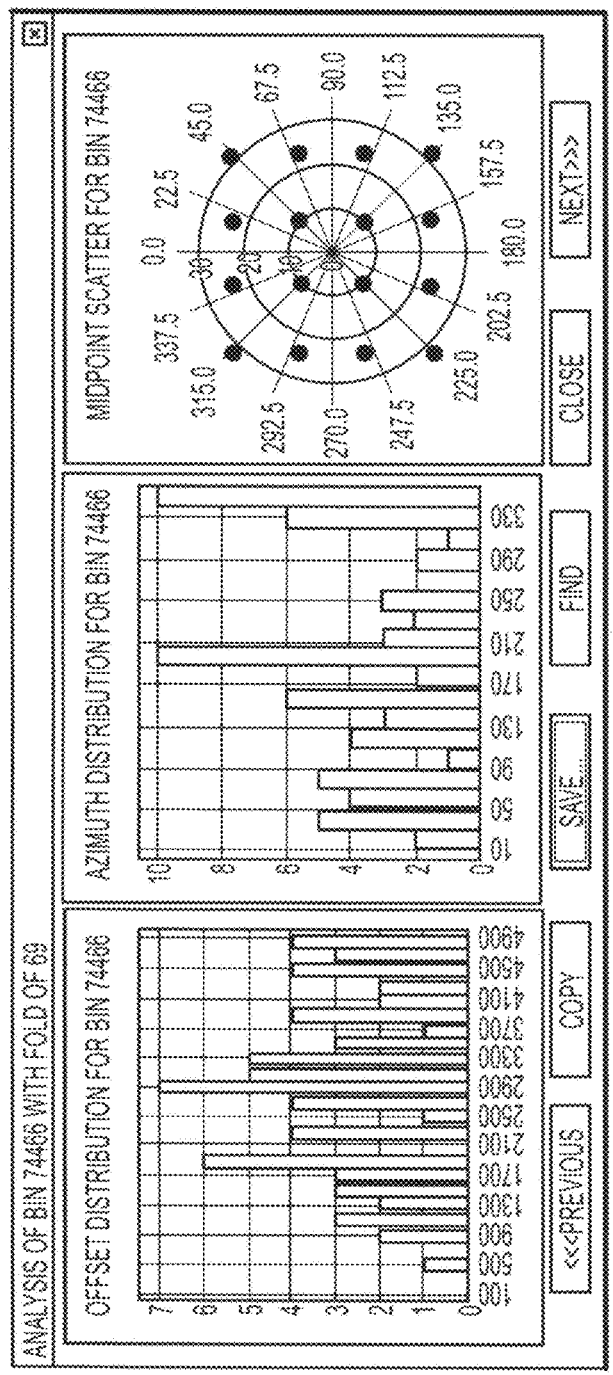
Figure 4D:
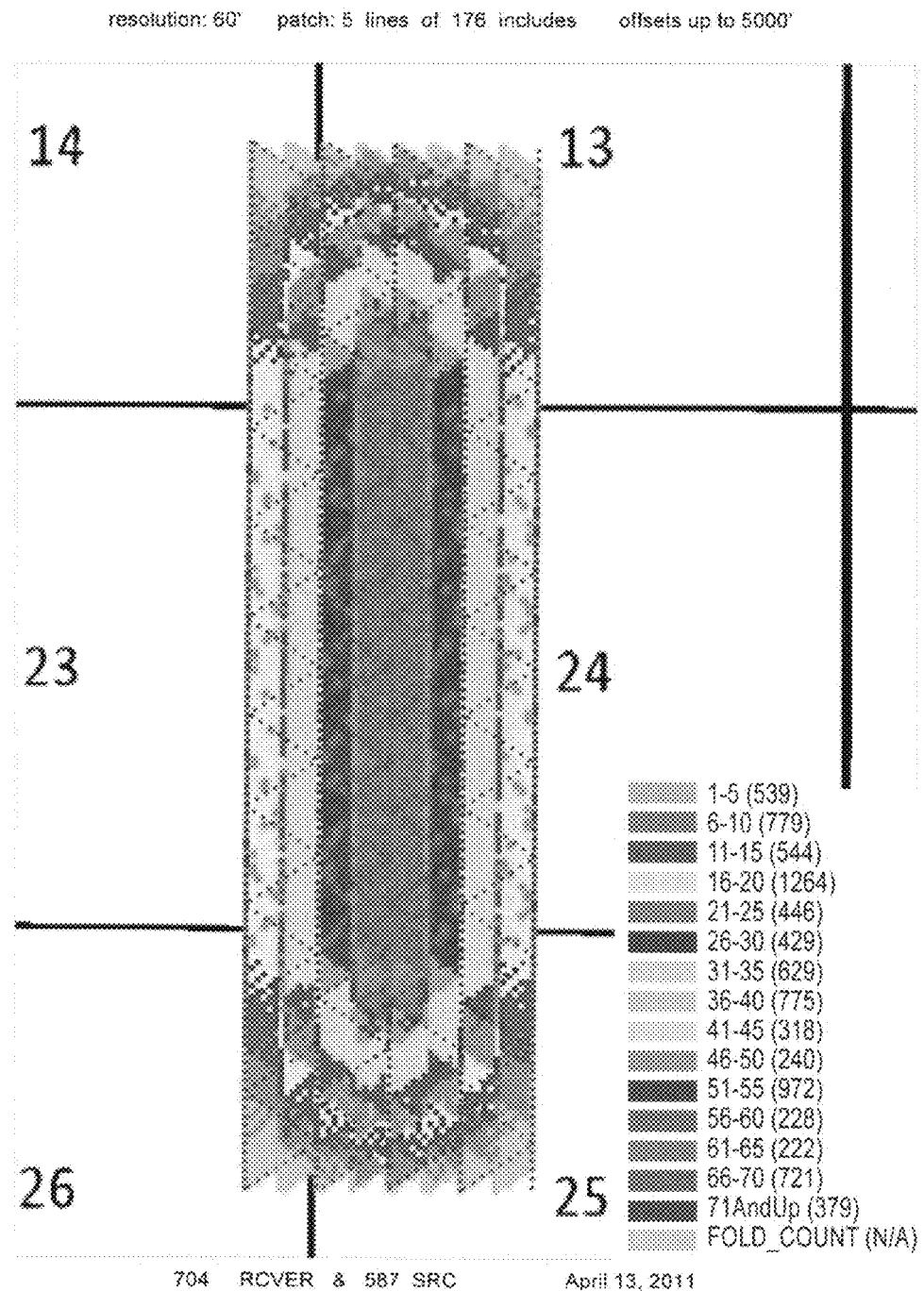

Regarding FIGS. 4A-D, these figures shows a seismic model generated by the seismic geographic survey generator 64 of a theoretical or candidate survey binned with 60-foot sized bins at a depth of 5000 feet. The color image of FIG. 4D is a map of the seismic survey designed specifically to violate the Fresnel zone assumptions and the colors represent various amounts of fold; see legend to the lower right. On the left side of each of the FIGS. 4A-4C is a graph is a histogram of offset and azimuth distribution and of randomly sampled, of common depth points (CDP) within the survey represented in FIG. 4D. Additionally, in the circular graph of each of the FIGS. 4A-C, the pattern of dots represents the common depth point positions within the 60-foot bins. For this theoretical or candidate survey, each bin has 16 subsurface image points that are centered on 15-foot grids within the 60-foot bin as one of ordinary skill in the art will understand.

Figure 5A:
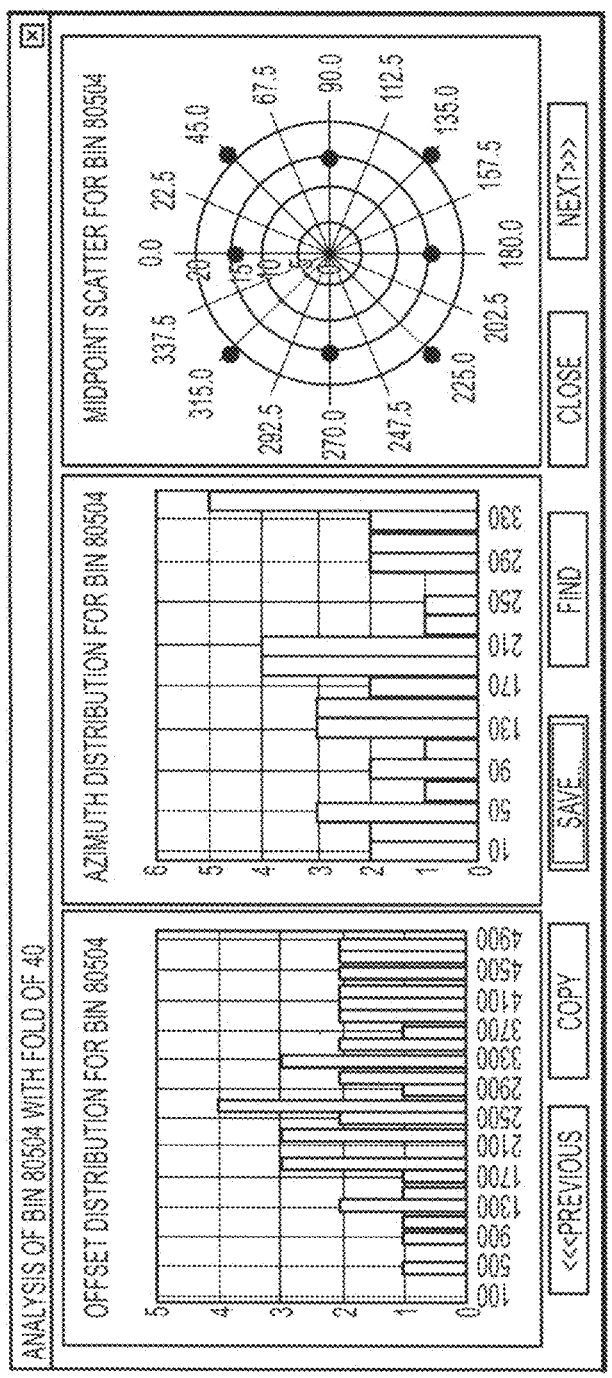
FIGS. 5A-D are very similar to the corresponding figures of FIGS. 4A-D except the bin sizes are 45-foot rather than 60 foot in size. However, the graphs in each of the FIGS. 5A-C are specific to the CDP bin pattern of 15-foot sub-bins or CDP's (common depth points) within the 45-foot bin, wherein the color map of FIG. 5D is a map of the fold within the survey and has map legend on the lower left of this figure.
Figure 5B:
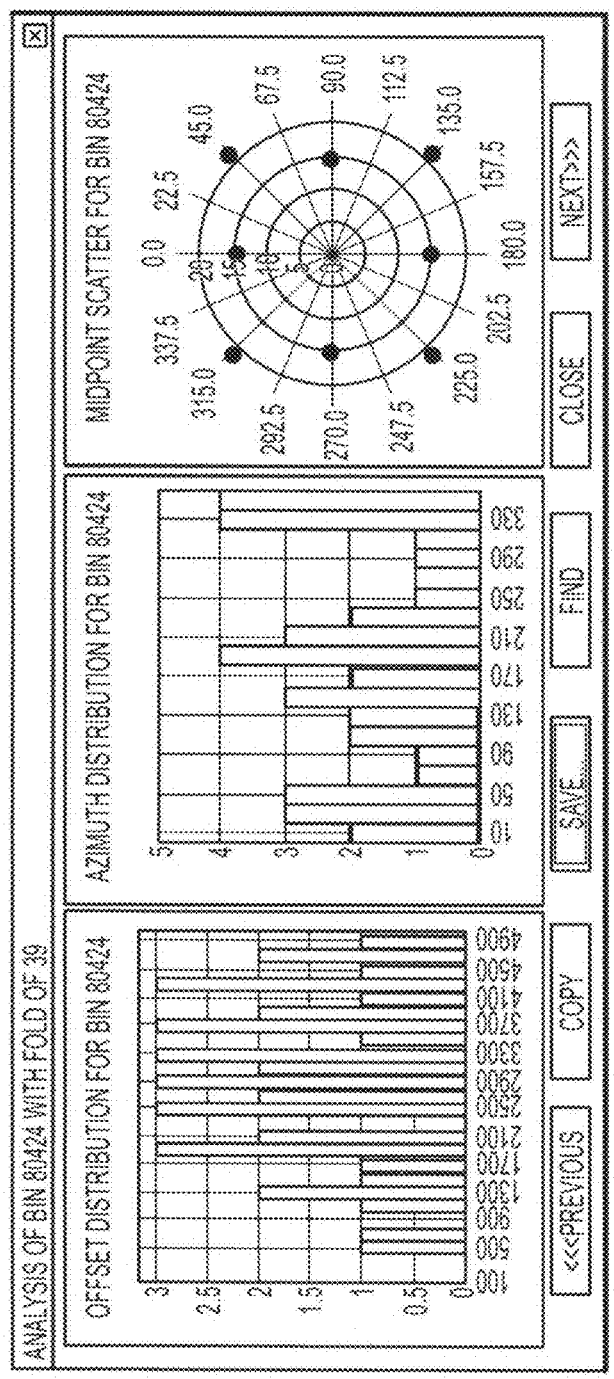
Figure 5C:
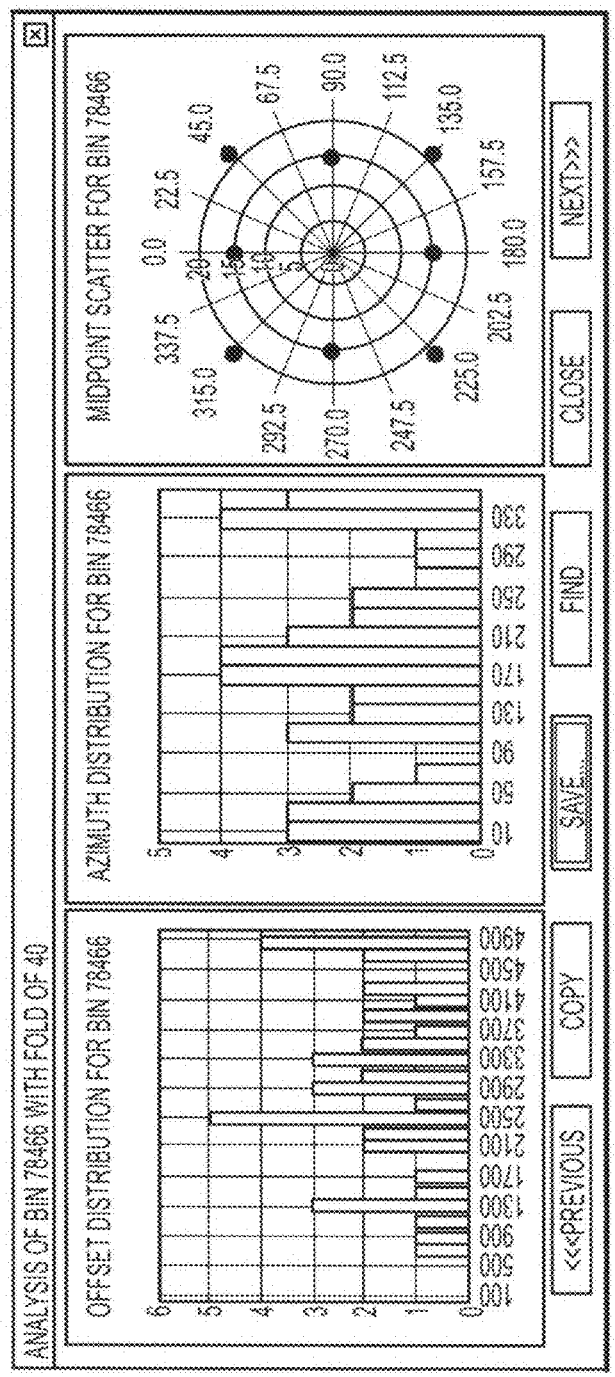
Figure 5D:
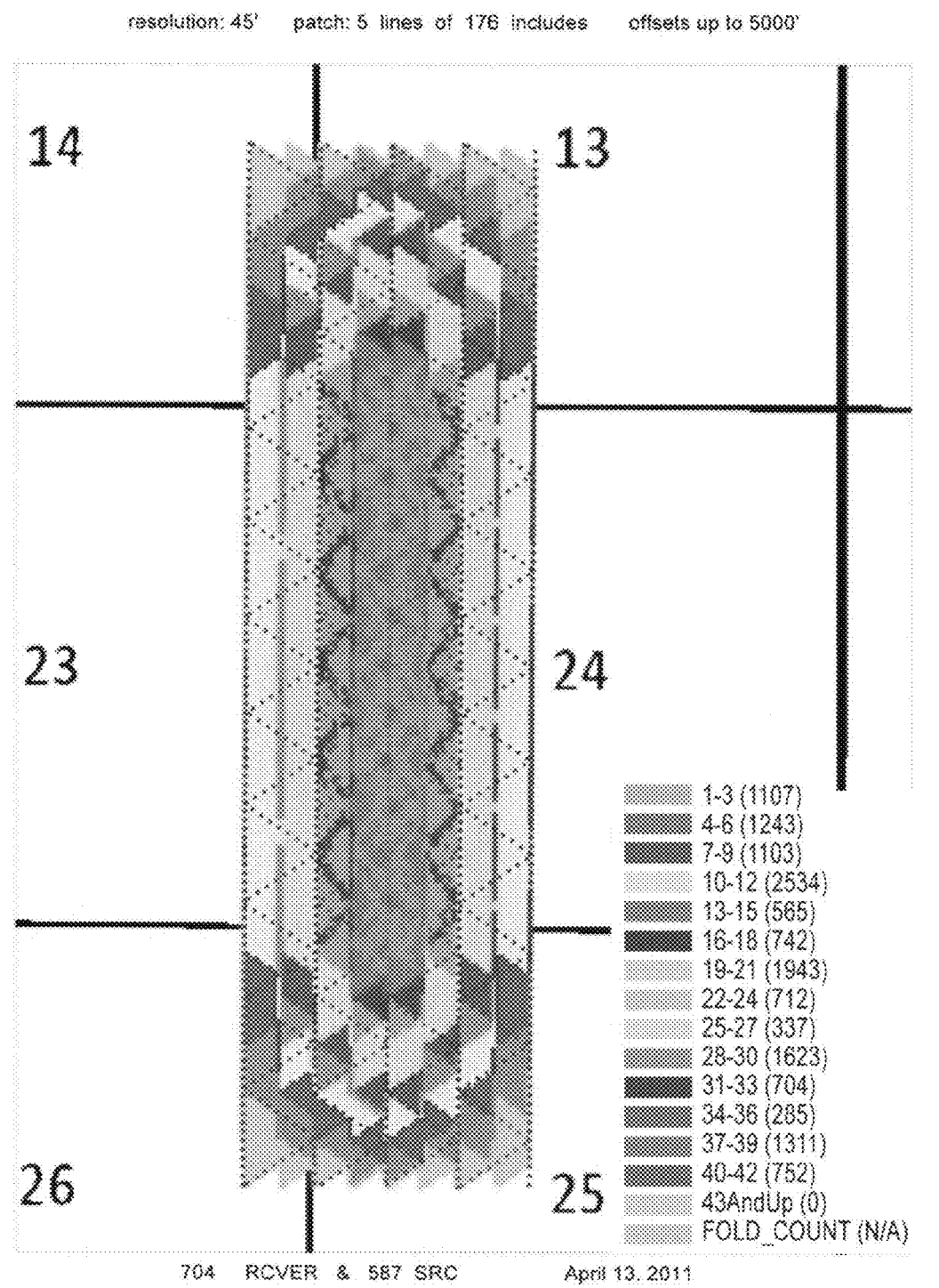

Regarding FIGS. 5A-D, these figures are very similar to FIGS. 4A-D showing another seismic model generated by the seismic geographic survey generator 64 of a theoretical or candidate survey except that the bin sizes are 45-foot rather than 60 foot. On the left side of each of the FIGS. 5A-5C is a graph specifying the CDP bin pattern of 15-foot sub-bins or CDP's (common death points) within the 45-foot bin as one of ordinary skill in the art will understand. The corresponding color map in FIG. 5D is a map of the fold within the theoretical or candidate survey and has map legend on the lower left of this figure.

Regarding FIGS. 6A-D, these figures are similar to FIGS. 3A-D and 4A-D except the bin sizes are now 30-feet, and there are only four 15 foot sub-bins within each 30 foot bin. Note how the fold decreases with successively smaller bins, which is a function of how many sub-bins of 15-feet are summed or captured in the binning of the resulting seismic trace data by the seismic data processing system 84 (FIG. 1).

Regarding FIG. 7, this figure shows one of the outputs from the database 42 for a range of bin sizes that are useful for designing seismic surveys that will fit within the mile land grid in the United States (see note and color coding in the lower portion of the figure) as one of skill in the art will understand. Also noted in red text, the receiver (RCVR) cable take-out distances that exceed "standard" cable take-out distances used by current wired land seismic recording system 80 is shown. This limitation is not constrained by cable less or wireless seismic recording systems 80 (FIG. 1).

Regarding FIG. 8, this figure shows three diagrams that illustrate the process of "superbinning" which is typically done in seismic data processing system 84 (or in some embodiments, in survey truck computer system 80) during the processing of the seismic trace data acquired according to a non-Freznel zone seismic survey design provided by the generator 40 (FIG. 1). In particular, "superbinning" is a process for aggregating or summing the trace data received from adjacent bins "superbins", wherein the "superbins" are non-overlapping and are square arrangements of integer multiples of the actual survey bins used. Note, with each increase of the bin size (for the "superbins"), more seismic trace data is summed into the larger bins for obtaining the higher fold observations in the fold maps shown in FIGS. 4D, 5D, 6D and 9.

Figure 6A:
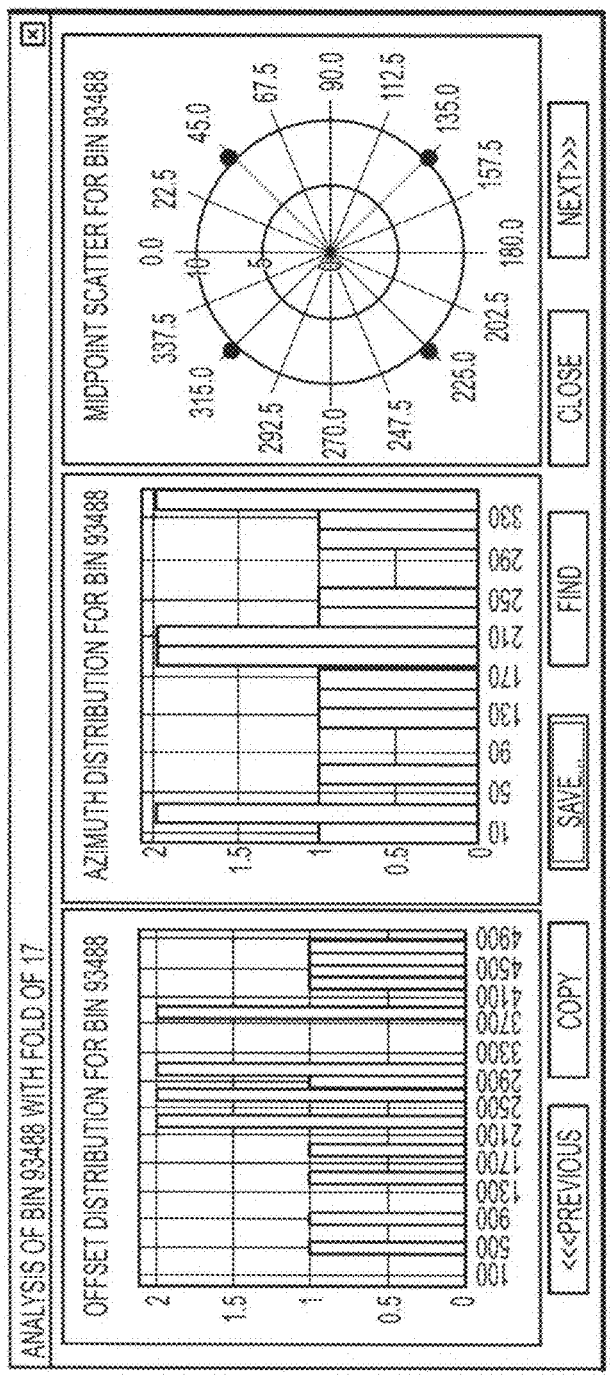
FIGS. 6A-D are similar to the corresponding figures of FIGS. 3A-D and 4A-D except the bin sizes are now 30-feet and there are only four 15 foot sub-bins within each 30 foot bin.
Figure 6B:
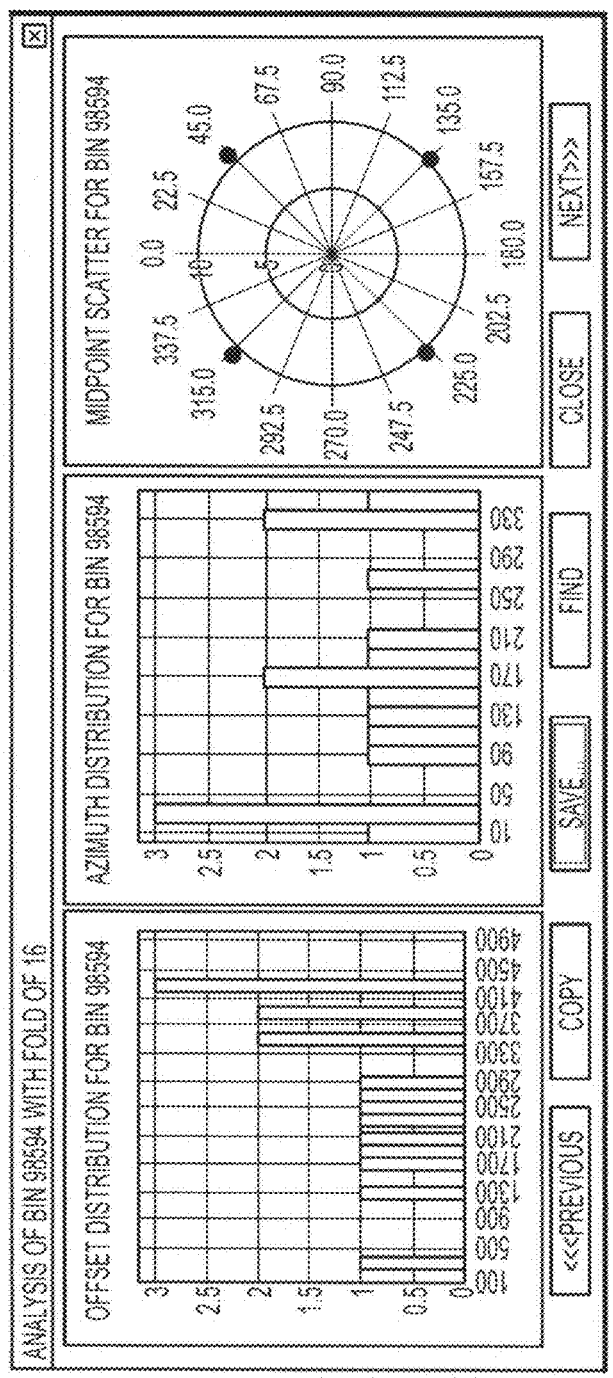
Figure 6C:
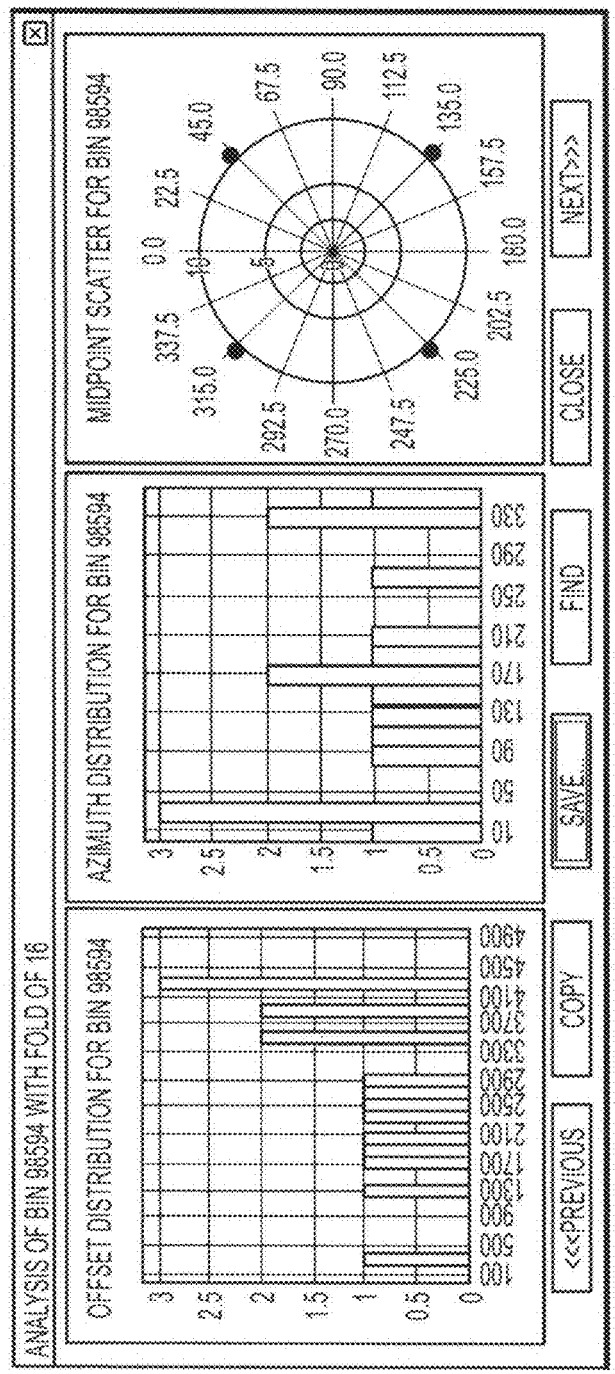
Figure 6D:
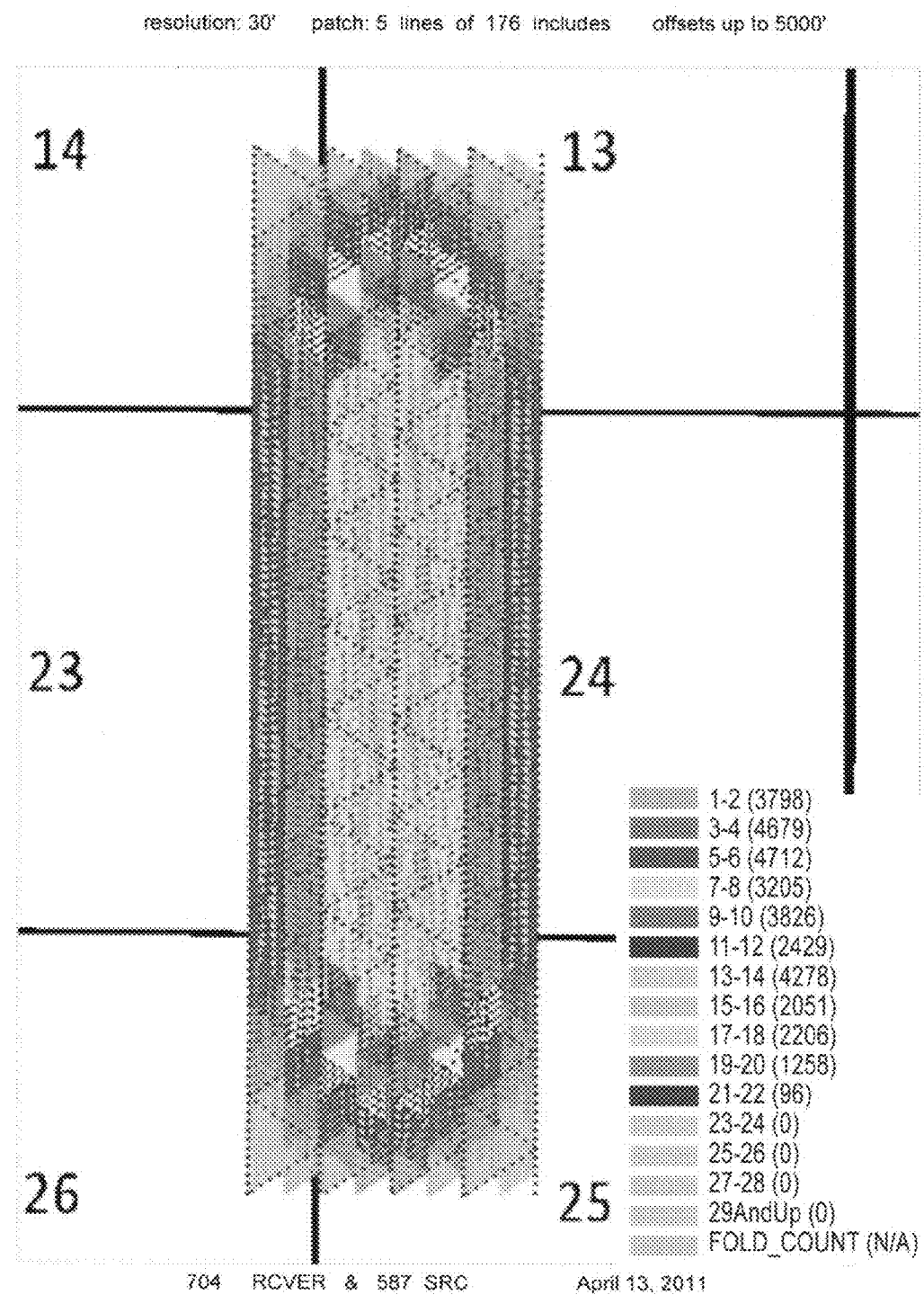

FIG. 9 shows two survey plots that are a result of the processing of FIG. 2 followed by at least the processing performed by the generator 64 (and in some embodiments, also the data collection and processing of the field computer system 68 and subsequently imaged. These survey plots show the repositioning around the various obstacles that are within the survey area causing one to move shots and receivers in accordance to 40. More particularly, FIG. 9 shows an example of a fold plot of a seismic survey (output by the generator 40) that was designed and processed according to the flowcharts shown in FIGS. 2 and 3. In particular, two fold maps are shown in FIG. 9 for the same trace data processed; the fold map on the left is for 30-foot bin "superbinning". The map on the right in FIG. 9 is a fold map the 30-foot bin spacing (i.e., bin size) whereas the fold map on the right is for 45 foot bin spacing. FIG. 9 also shows the robustness of the seismic survey design generation method disclosed herein when geological surface obstacles are encountered at the survey site, wherein such obstacles can cause the actual survey design to depart from the theoretical survey design output by the generator 40 to the surveyor's field computer system 68 (FIG. 1). In particular, in the upper center of each of the two fold maps in FIG. 9 is an area labeled "A", where there was a compressor station that could not be surveyed due to the presence of buildings in the seismic survey area. More specifically, for those who are skilled in the art, the fold map distortion (from the "ideal" fold plot generated by generator 64) as shown in FIGS. 4D, 5D, 6D is very acceptable given the fact that distortions from the "ideal planned survey" still produces results like those shown in FIGS. 10-13 described hereinbelow.

Additionally annotated on each fold map of FIG. 9 is an arrow starting at the same area on each map and pointing to each map's respective fold legend. The legion for the 30-fold map (on the left) indicates that the survey area identified by the start of the arrow (on this map) has 18-19 fold in this area (as identified by its color). The legion for the 45-fold map (on the right) indicates that the survey area identified by the start of the arrow (on this map) has 40-41 fold in this area (as identified by its color). Also worth noting is that neither of the fold maps of FIG. 9 show any "acquisition footprints" which are reflections of the source and receiver stations imprinting on the fold map as one of skill in the art will understand. Note that any acquisition footprint is a very undesirable attribute of any seismic survey design, and is not present with seismic data that uses the seismic survey design generation method disclosed herein. For example, referring to survey plots shown in FIG. 9 where obstructions within the survey site area caused severe departures (around two buildings in the northern third part of the survey site) from the ideal survey design (generated according to the generators 40 and 64), these severe departures from the ideal survey did not cause a corresponding severe distortion in the image in the fold map thus demonstrating to those skilled in the art that no acquisition footprint was the result of deviations in the survey design from the ideal.

FIGS. 10-13 show seismic images processed from seismic survey data wherein the source and receiver bin sizes used in conducting the survey was 15 feet. As described hereinbelow and shown in FIGS. 10-13, enhanced seismic imaging resolution, heretofore unavailable, is obtained by such small bin sizes. In particular, the bin size used (e.g., 15-foot bins) is substantially smaller than the smallest source and/or bin dedicated by the Freznel zone constraints used throughout the seismic survey industry. More particularly, for the seismic survey that yielded the FIGS. 10-13, the Freznel zone constraints dictate that the minimal source spacing should be 90 feet, the minimal receiver spacing should be 108.2 feet which yields a smallest bin size of 30 feet as one skilled in the art will understand, and no additional image resolution (by using smaller bins) can be achieved by reducing the survey source and receiver spacings below these values unless the entire survey layout is changed (e.g., the input to the generator 64, as in FIG. 7, would have to be substantially entirely reconfigured as one skilled in the art will appreciate; in particular, the lines or groupings of sources 44 and receivers 52 for the survey site would have to reconfigured with entirely different source and receiver layout lines or groupings; thus, such reconfiguring is fundamentally different from merely changing source and/or receiver spacings along their lines or their groupings, and also fundamentally different from changing an offset between such lines or groupings). So in the survey results of FIGS. 10-13, a bin size of 15 feet is substantially below the minimum of Freznel zone derived minimum bin size of 30 feet. However, it is believed that even smaller bin sizes (e.g., of 10 feet or smaller) may yield even better seismic image resolution if the corresponding fold value for bins is increased. Thus, the seismic survey source 44 and receiver 52 layout configuration that resulted in FIGS. 10-13 might yield even better seismic image resolution than shown in FIGS. 10-13 if, e.g., the receiver bin size were 10 feet and the fold value for the corresponding receiver bins were, e.g., in the range of 30 to 40. Moreover, it is important to note that the fundamental survey layout configuration would not change; i.e., substantially the same lines and/or groups of sources 44 and receivers 52 are used without adding additional lines and/or groups; however, additional sources and/or receivers may be added to the existing specified lines and/or groups as one skilled in the art will understand.

Figure 10:
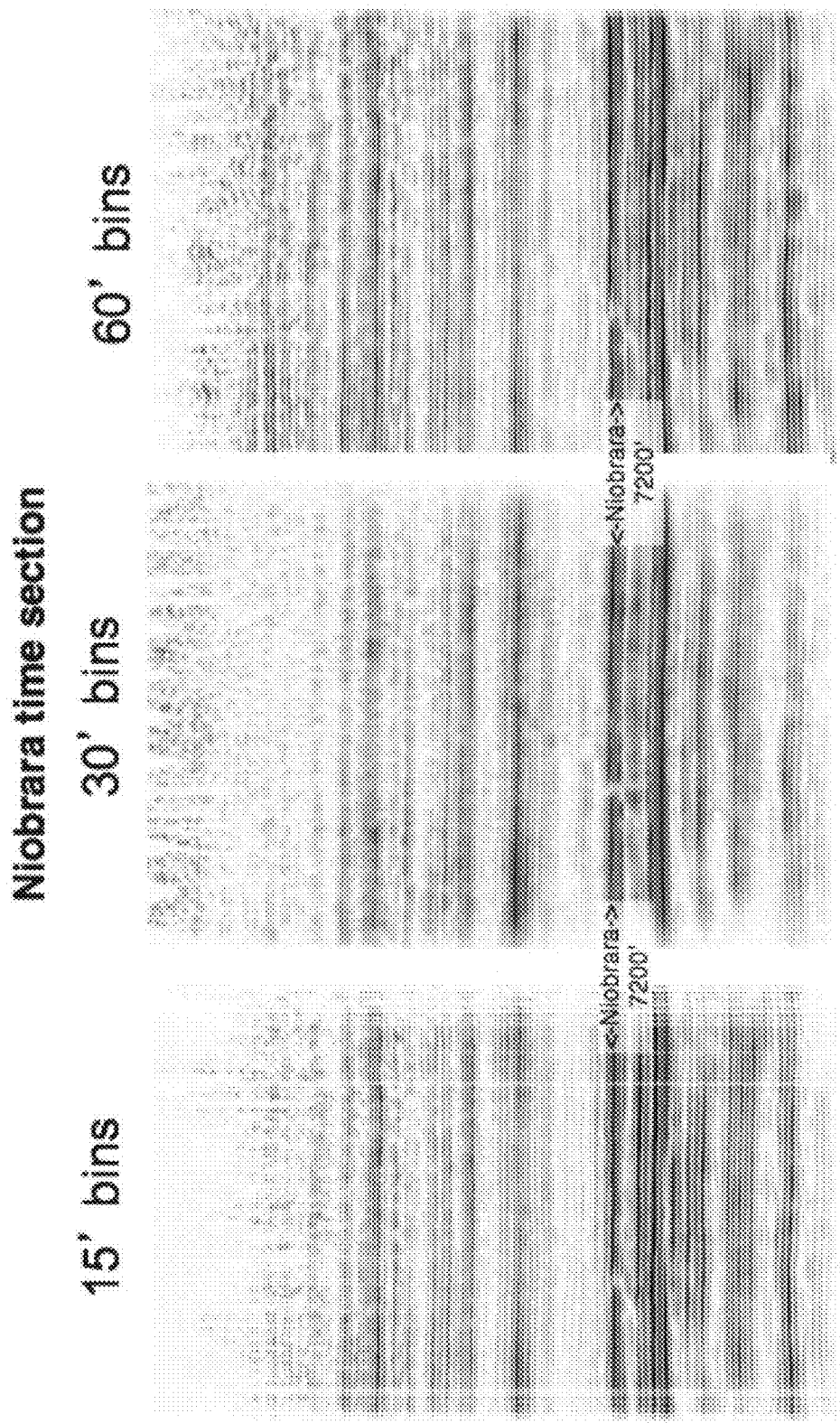
FIGS. 10 and 11 each show the same three time section seismic images resulting from the same seismic trace data for illustrating another aspect of the present disclosure. More particularly, for each of the FIGS. 10 and 11, the leftmost image was generated by a selected seismic data processing system 84 using the actual survey bin size of 15 feet (and having a fold of 9 when using all offsets designed to image a reflector at 7200 feet beneath the surface); the image in the middle was generated by the same seismic data processing system 84 using 30-foot superbins (and having a fold of 36), and the image on the right was generated by the same seismic data processing system 84 using 60-foot superbins (and having a fold of 144). Using all the available traces to image the geologic formation reflectors of interest at 7200 feet to obtain a fold value of approximately double to the fold value indicated in FIGS. 4-6.
Figure 11:
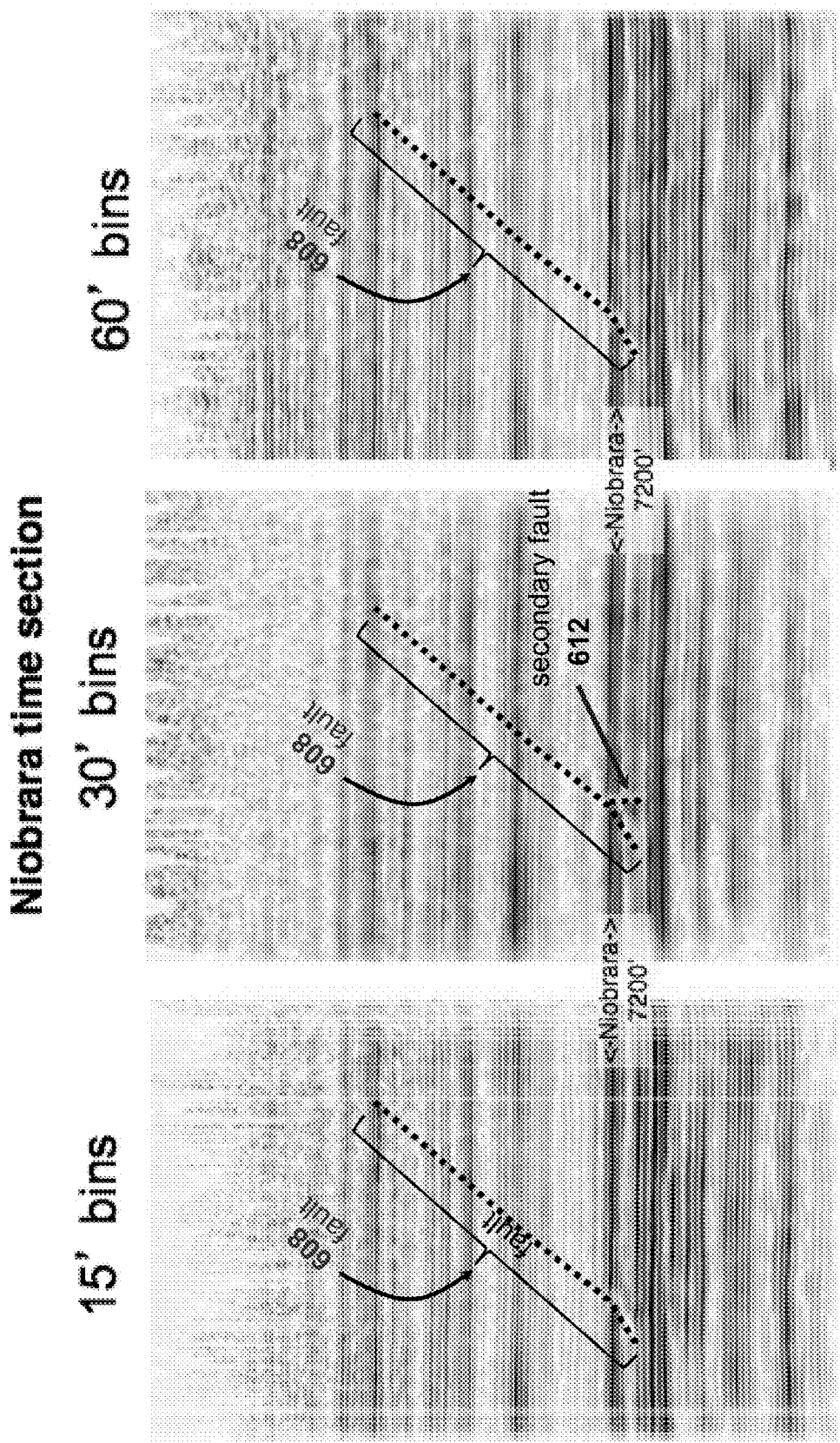

FIGS. 10 and 11 each show three time section seismic images of the same seismic trace data (obtained from a survey site known as the "Niobrara") which illustrate another aspect of the present disclosure. More specifically, even though very small Freznel zone violating bin sizes (e.g., of 15 feet) are desirable in performing the actual seismic survey, some superbinning is believed to be advantageous as these figures illustrate. In particular, by superbinning to at least twice (but, e.g., less than five times) the actual receiver bin size used to perform the site survey, additional resolution is obtained that heretofore has been unavailable in seismic imaging. Referring specifically to FIGS. 10 and 11, the images in FIG. 10 (from left to right) are, respectively, identical to the images of FIG. 11 (from left to right). In FIG. 10, the image for the 15-foot bins (having a fold of 9) shows only hints that there may be a fault 608 as, e.g., identified in the images of FIG. 11. Similarly, the image for 60-foot superbins (FIG. 10), having a fold of 144, provides at most a somewhat better indication that fault 604 exists. However, for those skilled in the art of interpreting such seismic images, the 30-foot superbinned image (FIG. 10) clearly shows the fault 608, and accordingly is preferred. Moreover, for those skilled in the art of interpreting such seismic images, the 30-foot bin image (FIG. 10) also shows another smaller fault 612 (FIG. 11) which is substantially entirely invisible in the 15-foot bin and 60-foot bin images. Accordingly, it is believed that some superbinning may be effective for reducing noise in the summed trace data and thereby actually enhancing image resolution even though the bins may be, e.g., as much as nine times greater (e.g., a superbin size of 3x per side, where x is the side length of the actual seismic survey bins). Said differently, it is believed that enhanced seismic image resolution is obtained when each of the bins or superbins used by the selected seismic data processing system 84 has a fold of at least high enough to overcome the noise such that the signal to noise level of the resultant seismic data is free of seismic acquisition noise (e.g., it is believed the fold value should be generally in the range of 20 to 100, and more particularly, in the range of 30 to 60, and most preferably, in the range of 34 to 45) while the actual survey bin size still remains substantially below the Freznel zone constraints (e.g., seven to ten times smaller than what would be dictated by the Freznel constraints).

Figure 12:
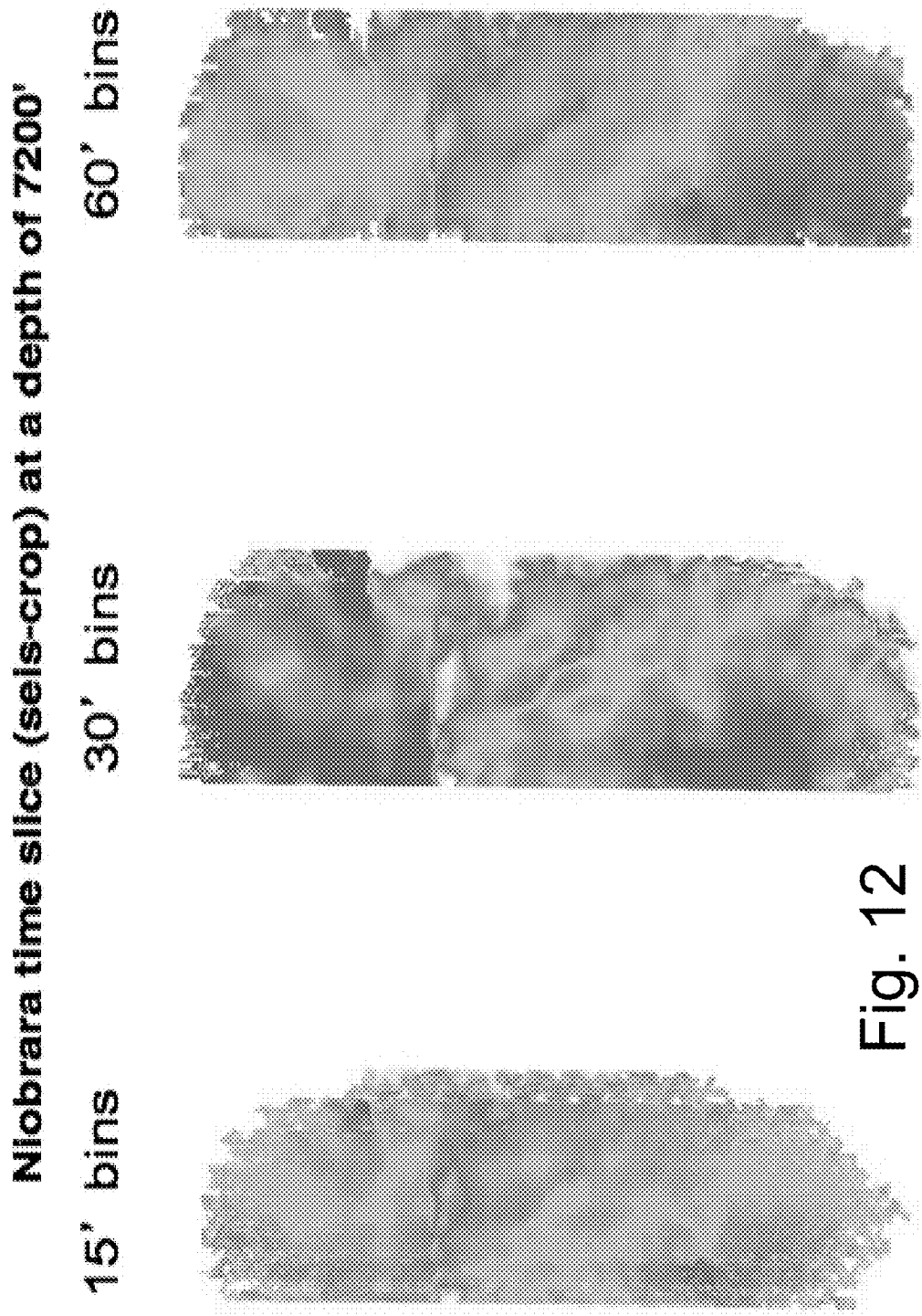
FIGS. 12 and 13 each show the same three seismic map images of a constant time slice or seis-crop (assumed to be from a substantially constant depth of 7,200 feet below the surface) of the Niobrara formation also shown in FIGS. 10 and 11. In particular, for each of the FIGS. 12 and 13 the images thereof were generated by the same seismic data processing system 84 that generated the images of FIGS. 10 and 11 using the same trace data as was used for the images of FIGS. 10 and 11 such that for each of the FIGS. 12 and 13: (a) the leftmost image thereof was generated using the actual survey bin size (and having a fold of 9), (b) the center image thereof was generated using the same 30-foot superbins as used for FIGS. 10 and 11 (and having a fold of 36), and (c) the rightmost image thereof was generated using 60-foot superbins (and having a fold of 144) as used for FIGS. 10 and 11.
Figure 13:
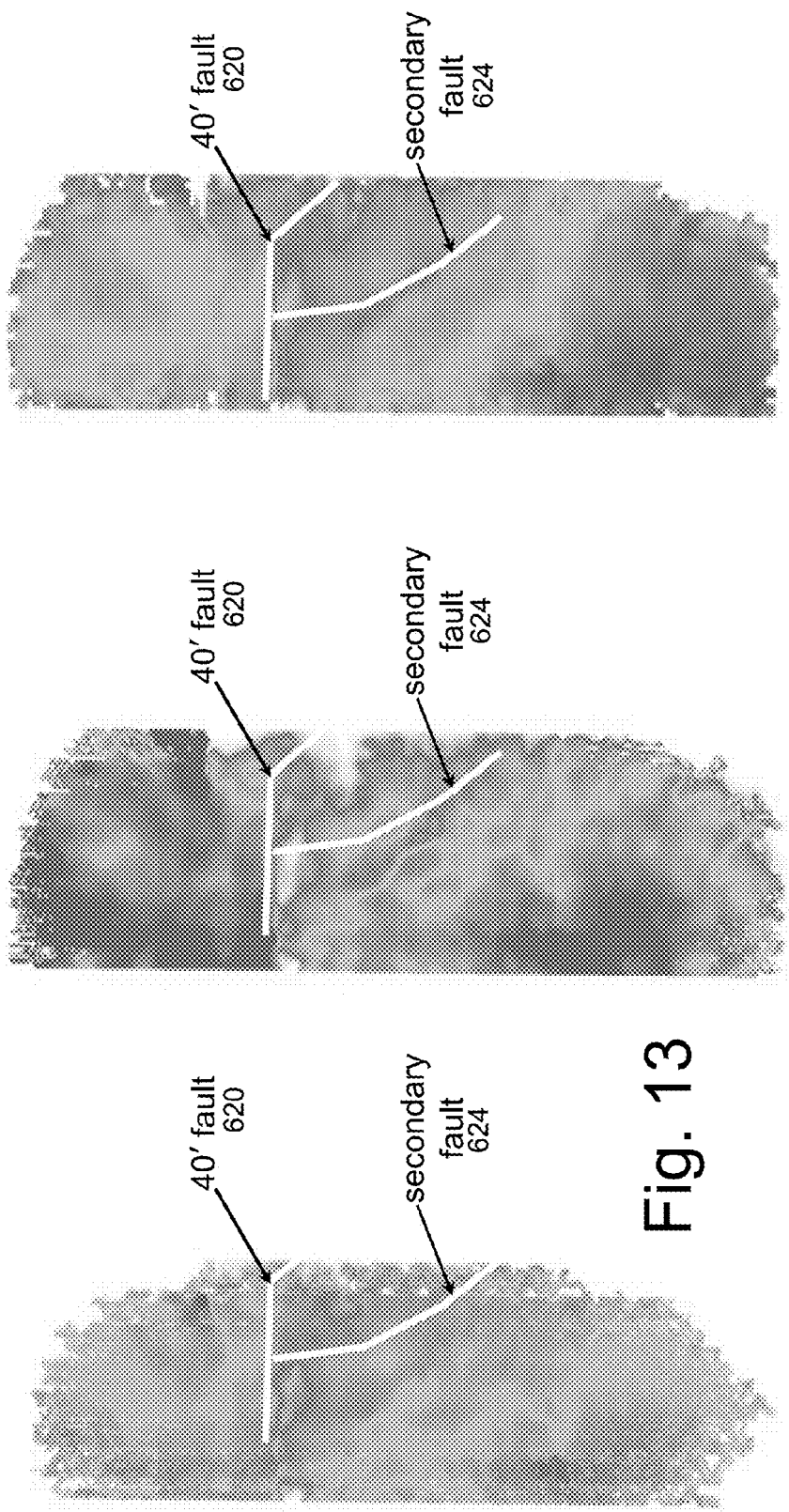

FIGS. 12 and 13 each show the same three seismic map images of a constant time slice or seis-crop (assumed to be from a substantially constant depth of 7,200 feet below the surface) of the Niobrara formation also shown in FIGS. 10 and 11. In particular, for each of the FIGS. 12 and 13 the images thereof were generated by the same seismic data processing system 84 that generated the images of FIGS. 10 and 11 using the same trace data as was used for the images of FIGS. 10 and 11 such that for each of the FIGS. 12 and 13: (a) the leftmost image thereof was generated using the actual survey bin size (and having a fold of 9), (b) the center image thereof, having a fold of 36, was generated using the same 30-foot superbins as used for FIGS. 10 and 11, and (c) the rightmost image thereof, having a fold of 144, was generated using 60-foot superbins as used for FIGS. 10 and 11.

In summary, since the 30-foot bin image provides a fold increase of four times over the 15-foot bin image in FIGS. 10-13, and the 60-foot bin image provides a fold increase of four times over the 30-foot bin foot image (as one skilled in the will understand), it is believed that at least some coalescing of bins for imaging is desirable for, e.g., reducing the noise in the traces. But it also appears that certain aggregated bins (resulting in bin sizes having bin sides that are an integer multiple of the actual site survey bin size), the derived seismic images may yield exceptionally enhanced resolution. In particular, with bin sizes, e.g., having sides two or three times the actual survey bin size (e.g., with a fold in the range of 20 to 100, and more particularly, in the range of 30 to 60, and most preferably, in the range of 34 to 45 for the actual survey used bins), exceptionally enhanced resolution may be available as shown by the middle images of FIGS. 10 and 11. Moreover, to further emphasize the efficacy of such Freznel zone violating small bin sizes, FIGS. 12 and 13 each show three seismic images of the same horizontal cross section of the Niobrara (derived from the same site survey trace data), such survey trace data believed to have been reflected from a horizontal cross section generally centered on (and including) the geologic formations between the arrow heads identifying the fractures 604 and 608 of the middle image of FIGS. 10 and 12. In each of the images of FIGS. 11 and 13, the reddish-orange colored areas 620 and 624 are believed to correspond, respectively, to the fractures 604 and 608 of FIG. 12. Note, that such images for site surveys having bin sizes that obey the Freznel Zone constraints show either of the colored areas 620 or 624. Moreover, just as with the 30 foot bin image of FIGS. 10 and 12, the 30-foot bin image of FIGS. 11 and 13 is recognized by seismic data interpreters as having the best resolution of the three images in FIGS. 11 and 13, and thus, also the preferred image by such interpreters.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

I claim:

1. A method for generating a seismic survey design for positioning a plurality of seismic signal sources and a plurality of seismic signal receivers, comprising the following steps performed by computational equipment:
    determining, by computational equipment, a smallest source or receiver bin size for performing an actual seismic survey corresponding to the seismic survey design, the actual seismic survey being for surveying a predetermined survey site;
    wherein the smallest source or receiver bin size is at least five times smaller than a smallest corresponding bin size dictated by Freznel zone constraints for the predetermined survey site and for a predetermined depth beneath a surface of the predetermined survey site;
    generating a candidate bin layout configuration using the smallest source bin size or receiver bin size, wherein the candidate bin layout configuration includes seismic trace data for positioning the seismic signal sources and the seismic signal receivers on the surface of the predetermined survey site;
    wherein an acceptability of the candidate bin layout configuration, is determined, the acceptability being dependent upon one of: (i) whether the candidate bin layout configuration is likely to yield a regular pattern of common depth points from the seismic trace data received at the seismic signal receivers, (ii) whether there is likely to be at least a predetermined minimum number of traces received at each of the seismic signal receivers, wherein the traces are effective for seismic image processing, and (iii) whether the candidate bin layout configuration is likely to be effective in imaging geologic formations beneath the predetermined survey site at the predetermined-depth;
    determining an additional source or receiver bin size, wherein the additional source or receiver bin size is greater than the smallest source or receiver bin size, but the additional source or receiver bin size is also at least five times smaller than the smallest corresponding bin size dictated by Freznel zone constraints for the predetermined survey site and for the predetermined depth beneath the surface of the predetermined survey site;
    generating an additional candidate bin layout configuration using the additional source or receiver bin size, wherein the additional candidate bin layout configuration includes seismic trace data for repositioning one or more of the seismic signal sources and the seismic signal receivers on the surface of the predetermined survey site;
    positioning each of the seismic signal sources and each of the seismic signal receivers on the predetermined survey site;
    recording a position on the predetermined survey site where each of the seismic signal sources and each of the seismic signal receivers is positioned, wherein the additional candidate bin layout configuration is used to position the seismic signal sources and seismic signal receivers at the predetermined survey site;
    generating seismic signals;
    recording at the seismic signal receivers corresponding seismic trace data received at the seismic signal receivers, for each of the seismic signal sources, the seismic trace data comprising data indicative of a detected reflection from the seismic signals generated by the seismic signal source together with identifications of the seismic signal source and seismic signal receiver that detected the detected reflection;
    wherein the recorded positions of the seismic signal sources, the recorded positions of the seismic signal receivers, and seismic trace data is input to computational equipment for generating subsurface seismic image data of geologic formations beneath the predetermined survey site at the predetermined depth; and
    wherein the subsurface seismic image data is displayed as a model of one or more geologic formations at the predetermined depth, the model used for identifying or detecting one or more of the geologic formations.

2. The method of claim 1, wherein said computational equipment comprises a host server or other machine computing system, wherein said host server or other machine computing system comprises a processor for processing digital data, at least one memory coupled to said processor for storing said digital data, and an application program stored in one or more of said memories and accessible by said processor for directing processing of said digital data by said processor.

3. The method of claim 2, wherein said computational equipment further comprises a display device coupled to said processor and said memory for displaying information derived from said digital data processed by said processor.

4. The method of claim 3, wherein said computational equipment further comprises a plurality of databases or data management systems.

5. The method of claim 1, wherein said model is improved image in comparison with an image obtained under Freznel zone constraints.

6. A system for performing collecting and processing seismic data, said system comprising:
    a plurality of seismic signal receivers, wherein one or more seismic signal sources is detectable by said seismic signal receivers; and
    computational equipment for determining a smallest source or receiver bin size, wherein said computational equipment generates a candidate bin layout configuration, wherein said candidate bin layout configuration comprises data for positioning said seismic signal sources or said seismic signal sources, wherein said computational equipment is in communication with said plurality of seismic signal receivers or with one or more of said seismic signal sources, wherein the smallest source or receiver bin size is at least five times smaller than a smallest corresponding bin size dictated by Freznel zone constraints for the predetermined survey site and for a predetermined depth beneath a surface of the predetermined survey site.

7. The system of claim 6, wherein said computational equipment comprises a host server or other machine computing system, wherein said host server or other machine computing system comprises a processor for processing digital data, at least one memory coupled to said processor for storing said digital data, and an application program stored in one or more of said memories and accessible by said processor for directing processing of said digital data by said processor.

8. The system of claim 7, wherein said computational equipment further comprises a display device coupled to said processor and said memory for displaying information derived from said digital data processed by said processor.

9. The system of claim 7, wherein said computational equipment further comprises a plurality of databases or data management systems.

10. The system of claim 6, wherein said computational equipment is used to determine an acceptability of said candidate bin layout configuration.

11. The system of claim 10, wherein said acceptability is dependent on whether the candidate bin layout configuration is likely to yield a regular pattern of common depth points from seismic trace data received at the receivers.

12. The system of claim 10, wherein said acceptability is dependent on whether there is likely to be at least a predetermined minimum number of traces received at each of the receivers, wherein the traces are effective for seismic image processing.

13. The system of claim 10, wherein said acceptability is dependent on whether the candidate bin layout configuration is likely to be effective in imaging geologic formations beneath the survey site at the predetermined depth.

* * * * *